US012297685B2

(12) United States Patent
Leonard et al.

(10) Patent No.: US 12,297,685 B2
(45) **Date of Patent: *May 13, 2025**

(54) POWERED DOOR UNIT WITH IMPROVED MOUNTING ARRANGEMENT

(71) Applicant: MAGNA CLOSURES INC., Newmarket (CA)

(72) Inventors: Jube Raymond Leonard, Barrie (CA); Saikat Bose, Richmond Hill (CA)

(73) Assignee: MAGNA CLOSURES INC., Newmarket (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/214,009

(22) Filed: Jun. 26, 2023

(65) Prior Publication Data

US 2023/0332456 A1 Oct. 19, 2023
US 2024/0229537 A2 Jul. 11, 2024

Related U.S. Application Data

(63) Continuation of application No. 17/206,198, filed on Mar. 19, 2021, now Pat. No. 11,713,609, and a (Continued)

(51) Int. Cl.
*E05F 15/00* (2015.01)
*E05F 15/622* (2015.01)

(52) U.S. Cl.
CPC ....... *E05F 15/622* (2015.01); *E05Y 2201/434* (2013.01); *E05Y 2201/70* (2013.01); (Continued)

(58) Field of Classification Search
CPC ....... E05F 15/41; E05F 15/622; E05F 1/1058; E05Y 2800/238; E05Y 2800/232; (Continued)

(56) References Cited

U.S. PATENT DOCUMENTS 2,371,336 A 3/1945 Levon
6,672,540 B1 1/2004 Shaheen et al.
(Continued)

FOREIGN PATENT DOCUMENTS

CN 204002170 U 12/2014
DE 3244795 A1 6/1984
(Continued)

*Primary Examiner* — Chi Q Nguyen
(74) *Attorney, Agent, or Firm* — Dickinson Wright PLLC

(57) ABSTRACT

A powered actuator for moving a motor vehicle closure panel from a closed position to an open position and method of construction thereof. Powered actuator includes an electric motor configured to rotate a driven shaft and a gearbox coupled to the driven shaft. An extensible member extends through the gearbox to a proximal end on one side of the gearbox for attachment to one of a vehicle body or the closure member and to a distal end on an opposite side of the gearbox. Extensible member is configured to move between retracted and extended positions in response to rotation of the driven shaft. A contamination cover enshrouds the extensible member between the gearbox and the distal end of the extensible member. Contamination cover moves between an axially extended state and an axially retracted state while the extensible member moves between the respective retracted position and the extended position.

21 Claims, 16 Drawing Sheets

Related U.S. Application Data continuation-in-part of application No. PCT/CA2020/051473, filed on Oct. 30, 2020.

(60) Provisional application No. 62/992,817, filed on Mar. 20, 2020, provisional application No. 62/944,022, filed on Dec. 5, 2019, provisional application No. 62/929,261, filed on Nov. 1, 2019.

(52) U.S. Cl.
CPC ... *E05Y 2201/702* (2013.01); *E05Y 2201/704* (2013.01); *E05Y 2600/32* (2013.01); *E05Y 2900/531* (2013.01)

(58) Field of Classification Search
CPC ......... E05Y 2800/205; E05Y 2900/548; E05Y 2400/337; E05Y 2900/546; E05Y 2201/434; E05Y 2201/70; E05Y 2201/702; E05Y 2600/32; E05Y 2900/531; Y10T 74/18576
See application file for complete search history.

(56) References Cited

U.S. PATENT DOCUMENTS

| | | | | |
|---|---|---|---|---|
| 7,066,041 | B2 * | 6/2006 | Nielsen | A47C 20/041 74/425 |
| 7,938,473 | B2 * | 5/2011 | Paton | E05F 15/622 49/340 |
| 9,222,296 | B2 * | 12/2015 | Hamminga | E05F 15/41 |
| 10,767,402 | B2 | 9/2020 | Hoffmann et al. | |
| 10,793,022 | B2 * | 10/2020 | Angerer | F16H 57/039 |
| 11,220,853 | B2 * | 1/2022 | Cumbo | E05F 15/41 |
| 11,713,609 | B2 * | 8/2023 | Leonard | E05F 15/622 49/324 |
| 2004/0090083 | A1 | 5/2004 | Greuel et al. | |
| 2008/0295624 | A1 | 12/2008 | Oberle et al. | |
| 2010/0236343 | A1 * | 9/2010 | Chiang | F16H 25/20 74/89.34 |
| 2011/0061199 | A1 | 3/2011 | Rauscher et al. | |
| 2013/0074412 | A1 | 3/2013 | Wellborn et al. | |
| 2014/0298980 | A1 | 10/2014 | Cyren et al. | |
| 2015/0059250 | A1 * | 3/2015 | Miu | E05F 15/611 49/350 |
| 2017/0292310 | A1 * | 10/2017 | Podkopayev | E05C 17/006 |
| 2018/0223583 | A1 * | 8/2018 | Podkopayev | F16H 37/04 |
| 2019/0048637 | A1 | 2/2019 | Wisniewski et al. | |
| 2019/0145137 | A1 | 5/2019 | Ueno et al. | |
| 2019/0211604 | A1 * | 7/2019 | Scheuring | E05F 15/70 |
| 2019/0211605 | A1 * | 7/2019 | Scheuring | E05F 15/70 |
| 2021/0254389 | A1 * | 8/2021 | Termine | E05F 15/622 |
| 2021/0270076 | A1 | 9/2021 | Neundorf | |

FOREIGN PATENT DOCUMENTS

| | | | |
|---|---|---|---|
| DE | 4003162 | A1 | 8/1991 |
| DE | 19617875 | C1 | 6/1997 |
| DE | 19623317 | A1 | 12/1997 |
| DE | 19623317 | C2 | 10/1999 |
| DE | 19921214 | A1 | 11/2000 |
| DE | 102011056225 | A1 | 6/2013 |
| DE | 102016124117 | A1 | 6/2018 |
| DE | 202019102031 | U1 | 5/2019 |
| DE | 102018118125 | A1 | 1/2020 |
| DE | 102018121533 | A1 | 3/2020 |
| DE | 102018121909 | A1 | 3/2020 |
| EP | 0803631 | A1 | 10/1997 |
| EP | 0877875 | B1 | 8/2004 |
| EP | 2041453 | B1 | 12/2010 |
| KR | 101976690 | B1 | 5/2019 |
| KR | 102286580 | A | 8/2021 |
| WO | 2018108930 | A1 | 6/2018 |
| WO | 2018215342 | A1 | 11/2018 |
| WO | 2020049138 | A1 | 3/2020 |

* cited by examiner

POWERED DOOR UNIT WITH IMPROVED MOUNTING ARRANGEMENT

CROSS-REFERENCE TO RELATED APPLICATIONS

The present application is a continuation of U.S. patent application Ser. No. 17/206,198, filed Mar. 19, 2021, now U.S. Pat. No. 11,713,609, which claims the benefit of previously filed U.S. Provisional Patent Application No. 62/992,817, filed Mar. 20, 2020, and is also a continuation-in-part of International Patent Application No. PCT/CA2020/051473, filed Oct. 30, 2020, which claims the benefit of U.S. Patent Application Ser. No. 62/944,022, filed on Dec. 5, 2019 and U.S. Patent Application Ser. No. 62/929,261, filed on Nov. 1, 2019, the contents of which are hereby incorporated by reference in their entirety herein.

FIELD

The present disclosure relates to a power actuator for a vehicle closure. More specifically, the present disclosure relates to a power actuator assembly for a vehicle side door.

BACKGROUND

This section provides background information related to the present disclosure which is not necessarily prior art.

Closure members of motor vehicles may be mounted by one or more hinges to the vehicle body. For example, passenger doors may be oriented and attached to the vehicle body by the one or more hinges for swinging movement about a generally vertical pivot axis extending along an edge of a shut face of the passenger door. In such an arrangement, each door hinge typically includes a door hinge strap connected to the passenger door, a body hinge strap connected to the vehicle body, and a pivot pin arranged to pivotably connect the door hinge strap to the body hinge strap and define a pivot axis. Such swinging passenger doors (“swing doors”) may be moveable by power closure member actuation systems. Specifically, the power closure member system can function to automatically swing the passenger door about its pivot axis between the open and closed positions, to assist the user as he or she moves the passenger door, and/or to automatically move the passenger door in between closed and open positions for the user.

Typically, power closure member actuation systems include a power-operated device such as, for example, an electric motor and a rotary-to-linear conversion device that are operable for converting the rotary output of the electric motor into translational movement of an extensible member. The electric motor and the conversion device are typically mounted to the passenger door in spaced relation from the shut face and the distal end of the extensible member is fixedly secured to the vehicle body. Being spaced from the shut face, a moment of inertia of the passenger door varies substantially as the door moves between closed and open positions, thereby causing the power needed to move the passenger door to vary. Further yet, in order to allow passenger door to swing without mechanical binding, an intermediate linkage is typically incorporated between the distal end of the extensible member and the vehicle body, thereby increasing the cost, complexity of design and weight of the power operated device. One example of a power closure member actuation system for a passenger door is shown in commonly-owned International Publication No. WO2013/013313 to Scheuring et al. which discloses use of a rotary-to-linear conversion device having an externally-threaded leadscrew rotatively driven by the electric motor and an internally-threaded drive nut meshingly engaged with the leadscrew and to which the extensible member is attached. Accordingly, control over the speed and direction of rotation of the leadscrew results in control over the speed and direction of translational movement of the drive nut and the extensible member for controlling swinging movement of the passenger door between its open and closed positions. The further the center of mass of the door is away from the pivot axis of the door, the more output force is required from the motor to move the door. Furthermore, binding of the extensible member also places additional strain on the motor and other greatrain components.

In view of the above, there remains a need to develop power closure member actuation systems which address and overcome limitations and drawbacks associated with known power closure member actuation systems as well as to provide increased convenience and enhanced operational capabilities.

SUMMARY

This section provides a general summary of some of the objects, advantages, aspects and features provided by the inventive concepts associated with the present disclosure. However, this section is not intended to be considered an exhaustive and comprehensive listing of all such objects, advantages, aspects and features of the present disclosure.

In one aspect, the present disclosure is directed to a vehicle closure panel and a powered actuator for the vehicle closure panel which advances the art and improves upon currently known vehicle closure panels and powered actuators for such vehicle closure panels.

In another aspect, the present disclosure is directed to a method of constructing a powered actuator for a closure panel of a motor vehicle which advances the art and improves upon currently known methods of constructing powered actuators for vehicle closure panels.

It is a related aspect to provide a powered actuator that is reliable, compact, and economical in manufacture, assembly, and in use.

It is a related aspect to provide a powered actuator that reduces the moment of inertia of a closure panel, thereby facilitating reliable opening and closing of the closure panel with a reduced size electric motor.

It is a related aspect to provide a powered actuator that eliminates the need for an intermediate linkage to connect a distal end of an extensible member to one of the vehicle body and the passenger door, thereby reducing the cost, complexity and weight of the powered actuator.

It is a related aspect to provide a powered actuator that is readily adaptable for use with a variety of closure panel configurations, both during original equipment manufacture and after-market.

In accordance with these and other aspects, a powered actuator for moving a motor vehicle closure panel from a closed position to an open position is provided. The powered actuator includes an electric motor configured to rotate a driven shaft and a gearbox coupled to the driven shaft. An extensible member is provided extending along an axis through the gearbox to a proximal end on one side of the gearbox and to a distal end on an opposite side of the gearbox. The proximal end of the extensible member is configured to be pivotably coupled to one of a vehicle body or the closure member. The extensible member is configured to move between a retracted position, corresponding to the closed position of the closure panel, and an extended position, corresponding to the open position of the closure panel, in response to rotation of the driven shaft. A contamination cover enshrouds at least a portion of the extensible member extending between the gearbox and the distal end of the extensible member. The contamination cover is configured to automatically move between an axially extended state having a first length while the extensible member is in the retracted position and an axially retracted state having a second length while the extensible member is in the extended position, wherein the first length is greater than the second length. The reduced second length provides an ability for the power actuator, and extensible member thereof, to pivot within an internal cavity in which the powered actuator is housed, thereby avoiding interference of the powered actuator with any internal components of the closure panel or vehicle body.

In accordance with another aspect of the disclosure, the contamination cover can be provided having a plurality of cover sections configured for axial movement along the axis relative to another, thereby causing the contamination cover to automatically transition between the first and second lengths.

In accordance with another aspect of the disclosure, the plurality of cover sections can be configured to nest with one another while the contamination cover is in the retracted state.

In accordance with another aspect of the disclosure, one of the cover sections can be fixed directly to the gearbox.

In accordance with another aspect of the disclosure, one of the cover sections can be fixed to the distal end of the extensible member, thereby causing the cover section to which the distal end of the extensible member is fixed to move axially in concurrent relation with the distal end of the extensible member.

In accordance with another aspect of the disclosure, a mount bracket can be pivotally attached to the gearbox, with the mount bracket providing for pivot movement of the gearbox relative to the mount bracket.

In accordance with another aspect of the disclosure, the mount bracket can be provided having a clearance opening through which the extensible member extends, wherein the extensible member can be configured to pivot within the clearance opening as the extensible member moves between the extended and retracted positions.

In accordance with another aspect of the disclosure, the axis of the extensible member can be arranged in generally perpendicular relation to a plane of the mount plate while the powered actuator is in the retracted position and to transition to an oblique relation to the plane of the mount plate while the powered actuator is in the extended position.

In accordance with another aspect of the disclosure, the mount bracket can be configured to be fixed to the other of the vehicle body or the closure member from the proximal end of the extensible member.

In accordance with another aspect of the disclosure, the proximal end of the extensible member can be configured to be pivotably coupled to the vehicle body and the mount bracket can be configured to be fixed to the closure member.

In accordance with another aspect of the disclosure, the mount bracket is fixed to one side of the gearbox and the contamination cover is fixed to an opposite side of said gearbox.

In accordance with another aspect of the disclosure, a method of constructing a powered actuator for moving a closure panel of a motor vehicle between a closed position and an open position is provided. The method includes, configuring an electric motor to drive a driven shaft and coupling a gearbox to the driven shaft. Disposing an extensible member through the gear box with the extensible member extending to a proximal end on one side of the gearbox and to a distal end on an opposite side of the gearbox and providing the proximal end being configured to be pivotably coupled to one of a vehicle body or the closure member. Further, configuring the extensible member to move between a retracted position, corresponding to the closed position of the closure panel, and an extended position, corresponding to the open position of the closure panel, in response to rotation of the driven shaft. Further yet, enshrouding at least a portion of the extensible member extending between the gearbox and the distal end with a contamination cover. And, configuring the contamination cover to move between an axially extended state having a first length while the extensible member is in the retracted position and an axially retracted state having a second length while the extensible member is in the extended position, with the first length being greater than the second length.

In accordance with another aspect of the disclosure, the method can include providing the contamination cover having a plurality of cover sections configured to move telescopically relative to one another as the contamination cover moves between the axially extended state and the axially retracted state.

In accordance with another aspect of the disclosure, the method can include configuring the extensible member for attachment to one of the vehicle body and the closure member without incorporating an intermediate linkage between the extensible member and the one of the vehicle body and the closure member.

In accordance with another aspect of the disclosure, the method can include pivotally attaching a mount bracket to the gearbox to provide for pivotal movement of the gearbox relative to the mount bracket, with the mount bracket being configured for direct attachment to one of the closure member and the vehicle body.

In accordance with another aspect of the disclosure, the method can include providing the mount bracket having a clearance opening and extending the extensible member therethrough, wherein the extensible member can be configured to pivot within the clearance opening as the extensible member moves between the extended and retracted positions.

In accordance with another aspect of the disclosure, the method can include pivotally attaching the mount bracket to one side of the gearbox, fixing one of the cover sections directly to an opposite side of the gearbox, and fixing another one of the cover sections to the distal end of the extensible member.

In accordance with another aspect of the disclosure powered actuator for moving a closure panel of a motor vehicle between a closed position and an open position including an electric motor configured to rotate a driven shaft, a gearbox coupled to said driven shaft, a gearbox housing enclosing the gearbox and having two apertures each connected to an interior space of the gearbox housing, an extensible member extending through both apertures and through the gearbox and having a proximal end being configured to be pivotably coupled to one of a vehicle body or the closure panel, said extensible member being configured to move between a retracted position, corresponding to the closed position of the closure panel, and an extended position, corresponding to the open position of the closure panel, in response to rotation of the driven shaft, a first cover connected to the housing for sealing the extensible member extending from one of the apertures, and a second cover connected to the housing for sealing the extensible member extending from the other one of the apertures. In a related aspect, the first cover and the second cover are collapsible. In another related aspect, the first cover and the second cover are separate and distinct from each other. In a related aspect the first cover and the second cover are formed from a flexible material.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. Other advantages of the present embodiments than discussed expressly herein will be readily appreciated, as the same becomes better understood by reference to the following detailed description and appended claims when considered in connection with the accompanying drawings, wherein:

Figure 14:
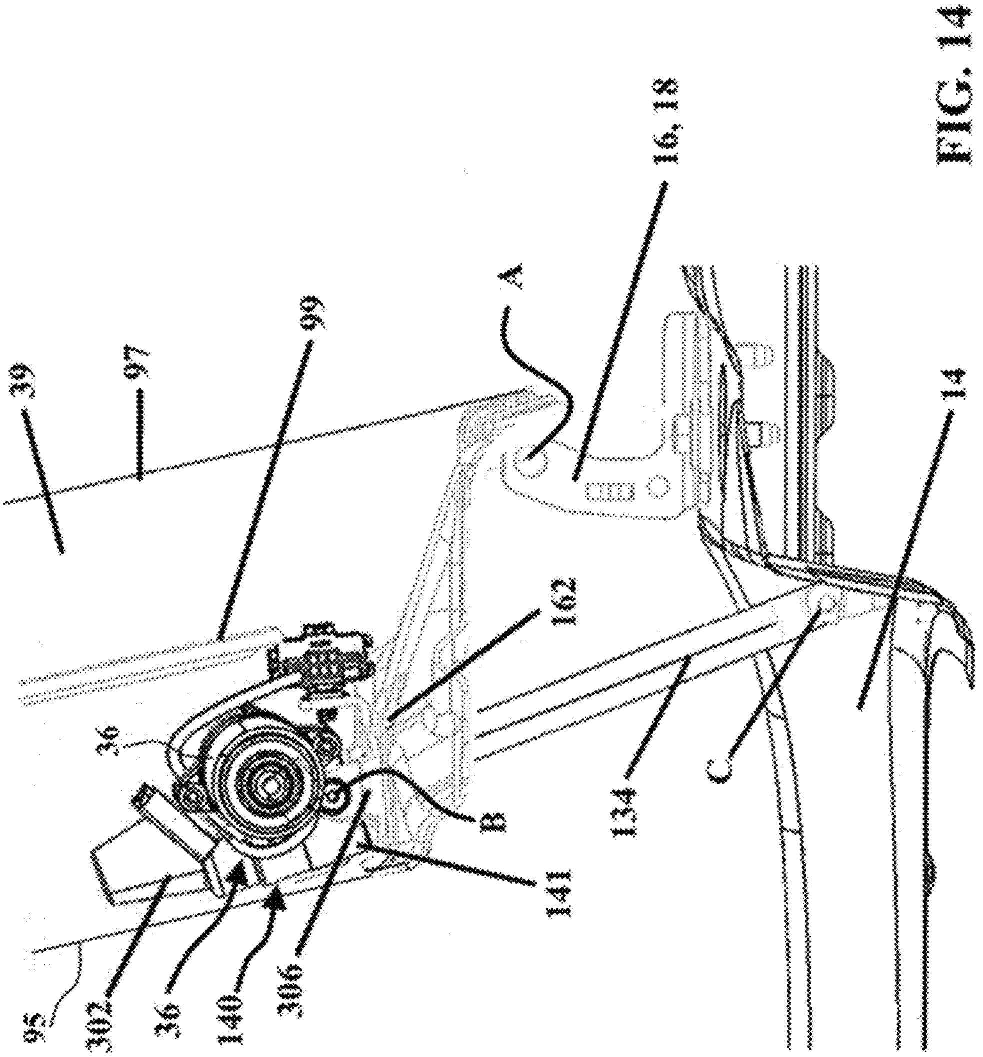

FIG. 14 is a top partial sectional view of a closure panel in an open position with the extensible member in an extended position but not extending substantially with in the inner cavity of the closure panel and having a shroud or cover in a collapsed position, also showing a window pane and inner panel adjacent the extensible member in a non-interference manner with the extensible member and with the shroud.

Figure 15:
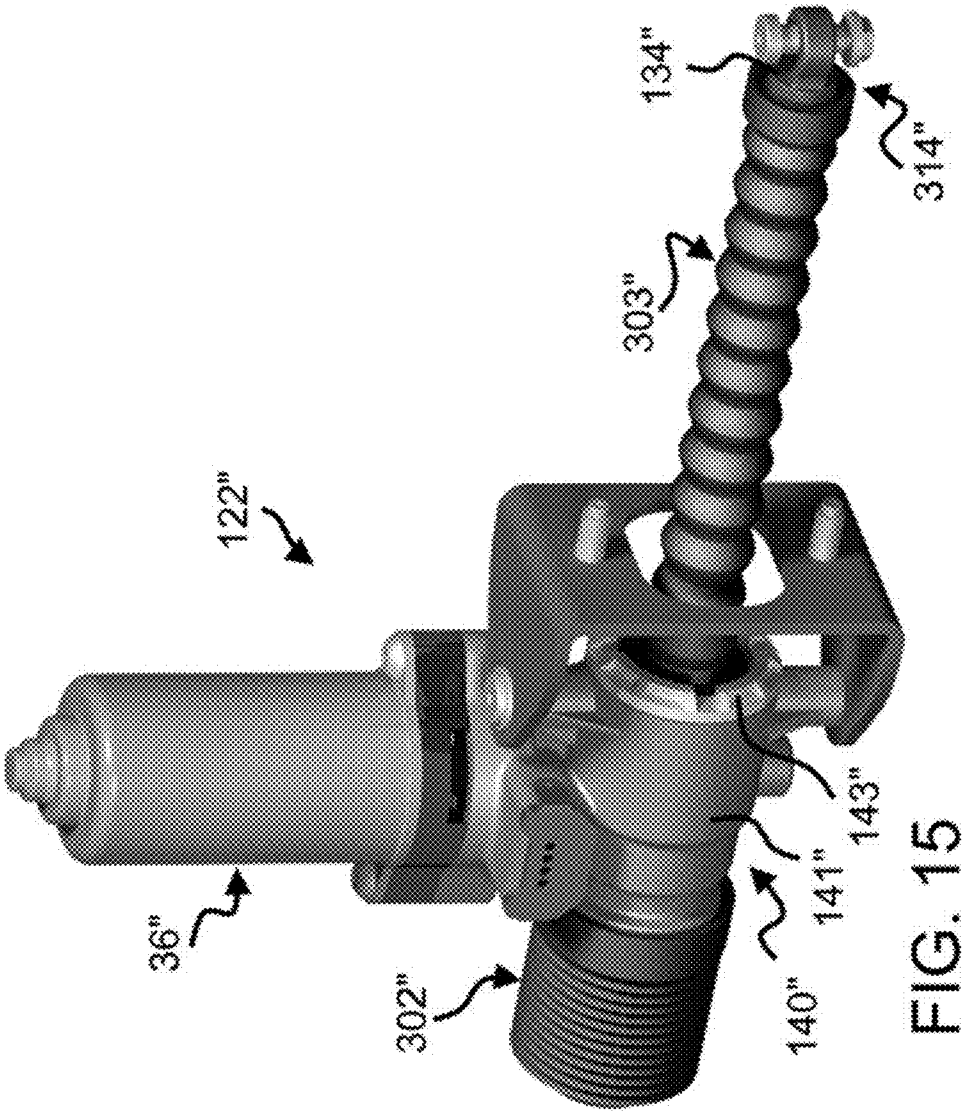
Figure 16:
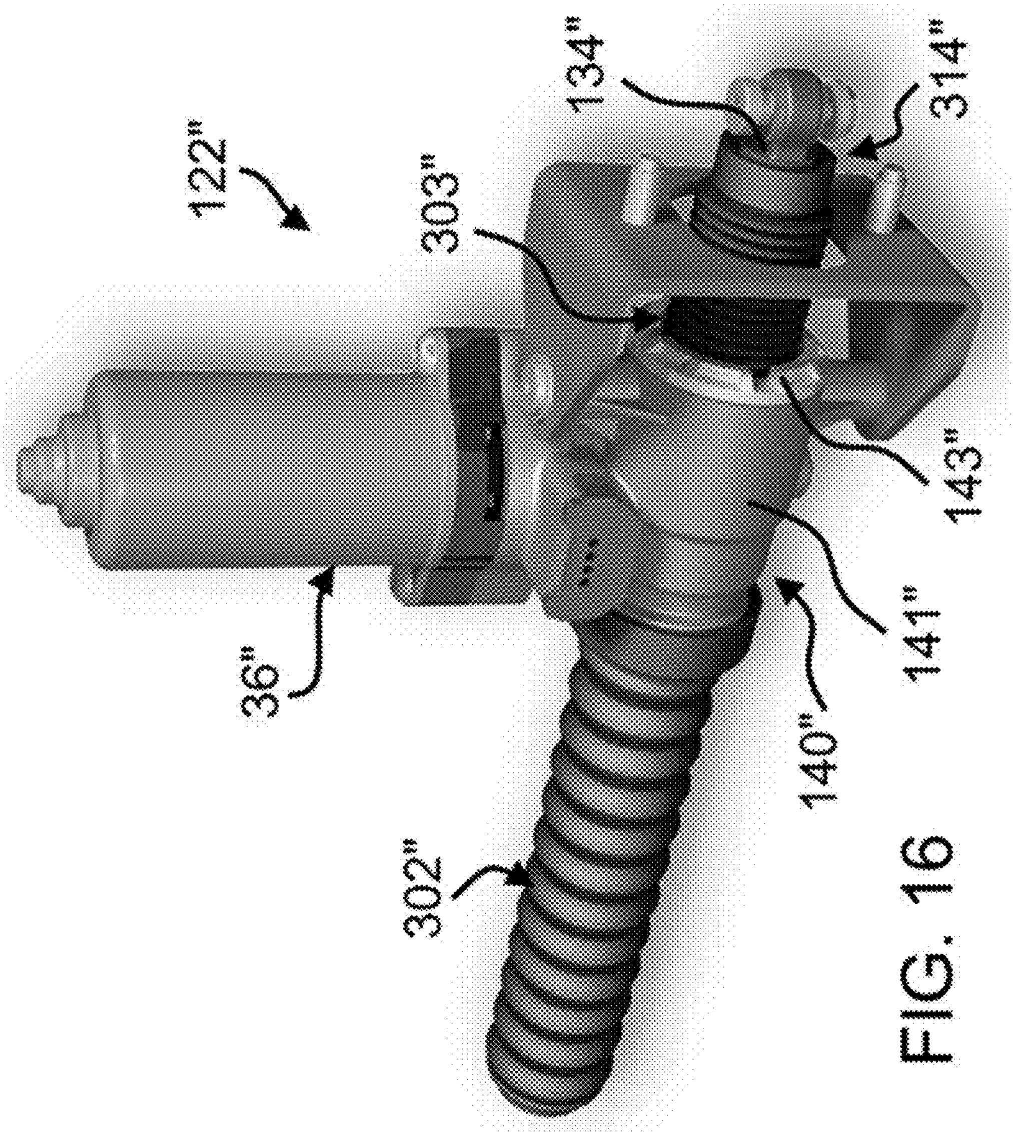
Figure 17:
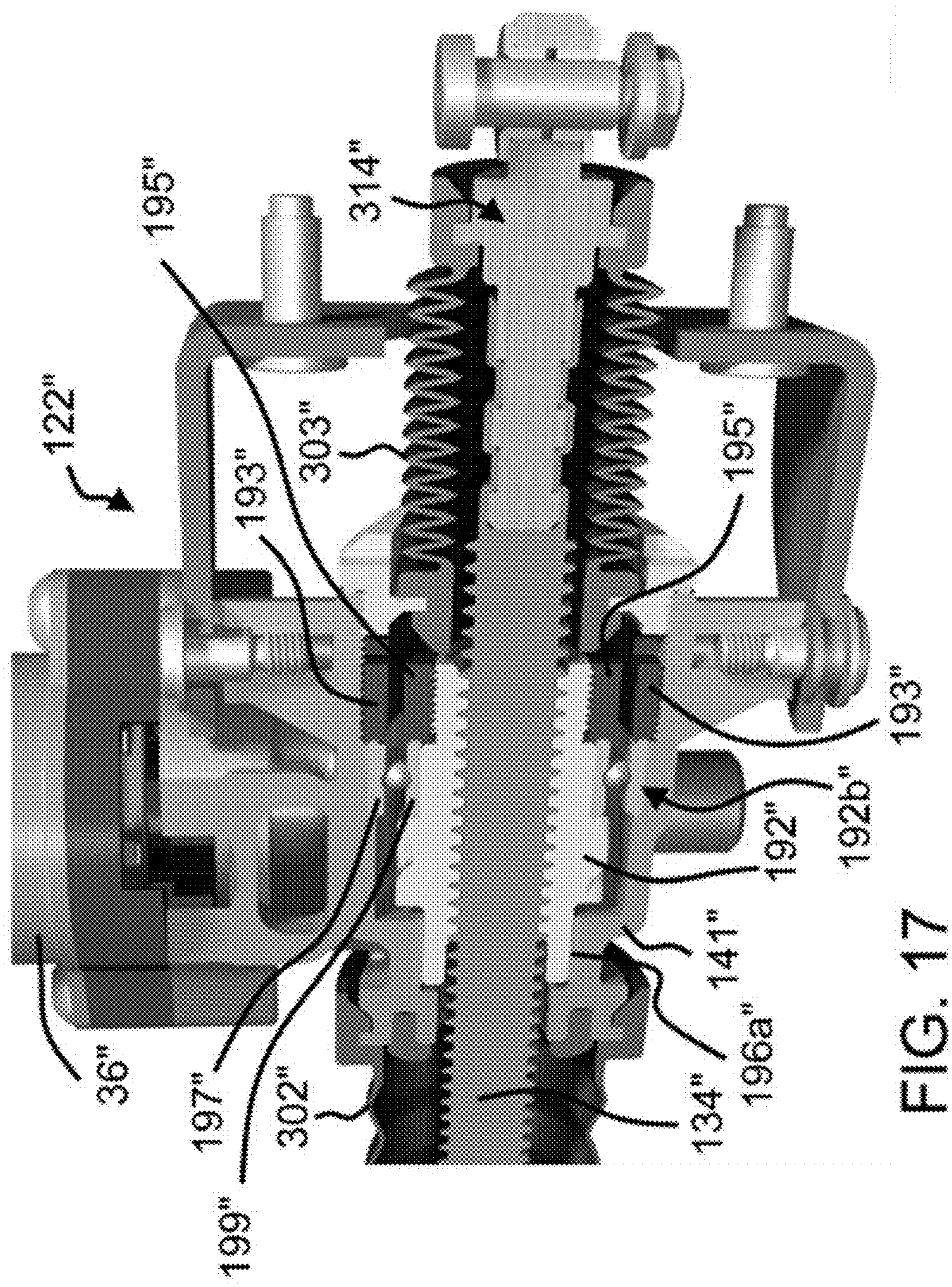

FIG. 15 illustrates a front perspective view of a third powered actuator having an extensible member in an extended position corresponding to a door opened position according to aspects of the disclosure;

FIG. 16 illustrates a front perspective view of the third powered actuator of FIG. 15 having an extensible member in a retracted position corresponding to a door closed position according to aspects of the disclosure; and FIG. 17 is a cross-sectional view of the powered actuator of FIG. 15 illustrated a support arrangement for a torque tube, according to aspects of the disclosure.

Corresponding reference numerals indicate corresponding parts throughout the several views of the drawings.

DETAILED DESCRIPTION OF EXAMPLE EMBODIMENTS

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
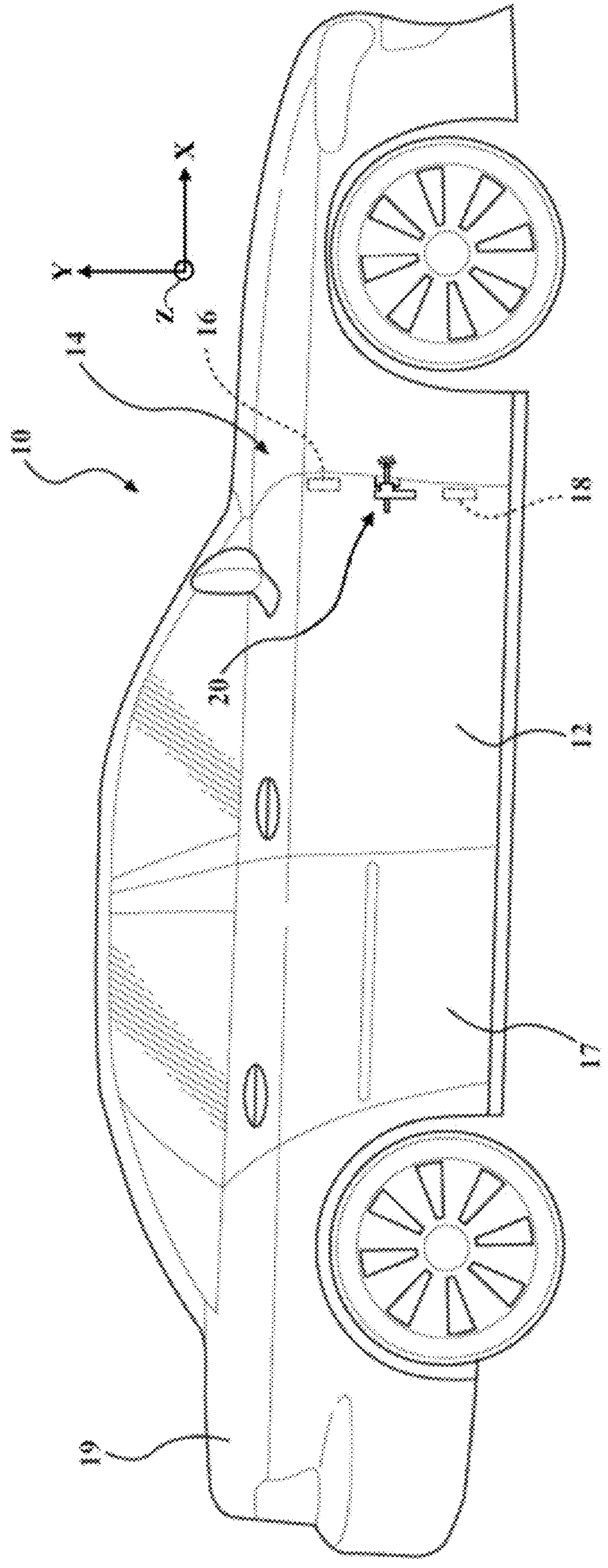
FIG. 1 is a side view of an example motor vehicle equipped with a power closure member actuation system situated between the front passenger swing door and a vehicle body, according to aspects of the disclosure.

Referring initially to FIG. 1, an example motor vehicle 10 is shown to include a first passenger door 12 pivotally mounted to a vehicle body 14 via an upper door hinge 16 and a lower door hinge 18 which are shown in phantom lines. In accordance with the present disclosure, a power closure member actuation system 20 is pivotally connected between first passenger door 12 and the vehicle body 14. In accordance with a preferred configuration, power closure member actuation system 20 generally includes a power-operated actuator mechanism or actuator 22 secured within an internal cavity of passenger door 12, and a rotary drive mechanism that is driven by the power-operated actuator mechanism 22 and is drivingly coupled to the vehicle body 14. Driven rotation of the rotary drive mechanism causes controlled pivotal movement of passenger door 12 relative to vehicle body 14. In accordance with this preferred configuration, the power-operated actuator mechanism 22 is pivotally coupled to and in close proximity with the shut face of the door 12 between hinges 16, 18 while the rotary drive mechanism is pivotally coupled to the vehicle body 14. However, those skilled in the art will recognize that alternative packaging configurations for power closure member actuation system 20 are available to accommodate available packaging space. One such alternative packaging configuration may include mounting the power-operated actuator mechanism 22 to vehicle body 14 and drivingly interconnecting the rotary drive mechanism to the door 12.

Each of upper door hinge 16 and lower door hinge 18 include a door-mounting hinge component and a body-mounted hinge component that are pivotably interconnected by a hinge pin or post. The door-mounted hinge component is hereinafter referred to a door hinge strap while the body-mounted hinge component is hereinafter referred to as a body hinge strap. While power closure member actuation system 20 is only shown in association with front passenger door 12, those skilled in the art will recognize that the power closure member actuation system 20 can also be associated with any other closure member (e.g., door or liftgate) of vehicle 10 such as rear passenger doors 17 and decklid 19 as examples.

Figure 2:
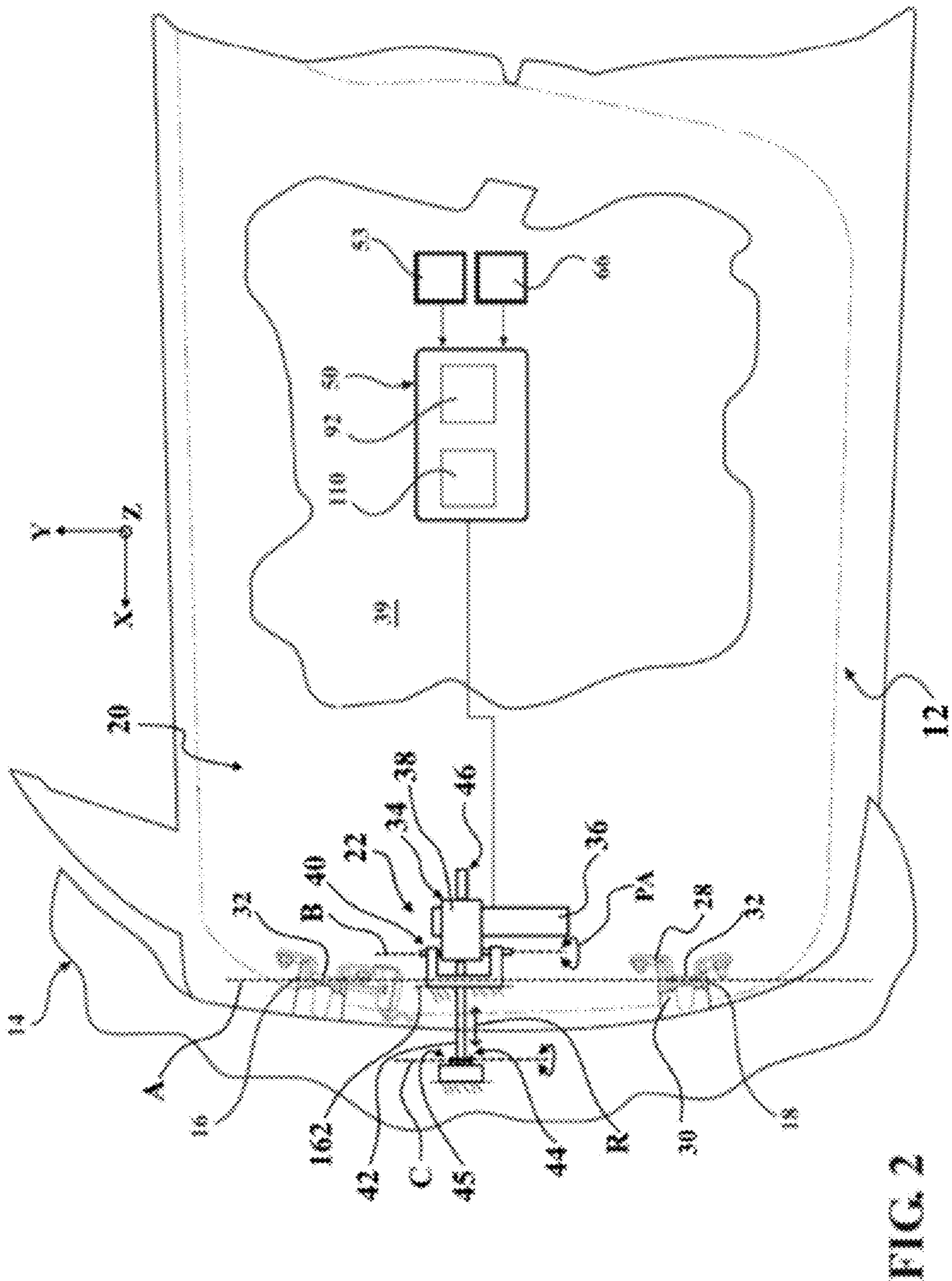
FIG. 2 is a broken away inner side view of a closure member shown in FIG. 1, with various components removed for clarity purposes only, in relation to a portion of the vehicle body and which is equipped with the power closure member actuation system, according to aspects of the disclosure.

Power closure member actuation system 20 is generally shown in FIG. 2 and, as mentioned, is operable for controllably pivoting vehicle door 12 relative to vehicle body 14 between an open position and a closed position. As shown in FIG. 2, lower hinge 18 of power closure member actuation system 20 includes a door hinge strap 28 connected to vehicle door 12 and a body hinge strap 30 connected to vehicle body 14. Door hinge strap 28 and body hinge strap 30 of lower door hinge 18 are interconnected along a generally vertically-aligned pivot axis A via a hinge pin 32 to establish the pivotable interconnection between door hinge strap 28 and body hinge strap 30. However, any other mechanism or device can be used to establish the pivotable interconnection between door hinge strap 28 and body hinge strap 30 without departing from the scope of the subject disclosure.

As best shown in FIG. 2, power closure member actuation system 20 includes the power-operated actuator mechanism 22 having a motor and geartrain assembly 34 that is rigidly connectable to vehicle door 12. Illustratively, the power closure member actuation system 20 is pivotally connected to the shut face 162 of the vehicle door 12. Motor and geartrain assembly 34 is configured to generate a rotational force about pivot axis A. In the preferred embodiment, motor and geartrain assembly 34 includes an electric motor 36 that is operatively coupled to a speed reducing/torque multiplying assembly 38, as a gearbox having one or more stages with a gear ratio allowing motor 36 and geartrain assembly 34 to generate a rotational force having a high torque output by way of a very low rotational speed of electric motor 36. However, any other arrangement of motor and geartrain assembly 34 can be used to establish the required rotational force without departing from the scope of the subject disclosure. Electrical motor 36 is controlled by electronics shown illustratively as block 50 in FIG. 2 which may include a microprocessor 110 and power electronics 92, such as H-bridge, FETS for example, controlled by the microprocessor 110. Controller 50 is electrically connected to command sources such as a door open or close switch 53, or to another controller 66 such as a Body Control Module, or an authentication controller such as PKE controller for example.

Motor and geartrain assembly 34 includes a mounting bracket 40 for establishing the connectable relationship with vehicle door 12 and the power-operated actuator mechanism 22. The connectable relationship of the power-operated actuator mechanism 22 with the vehicle door 12 via the mounting bracket 40 is illustrated as a pivotal connection to allow the power-operated actuator mechanism 22 to pivot about a pivot axis B, for example with rotations indicated as PA in FIG. 2. Mounting bracket 40 is configured to be connectable to vehicle door 12 between the upper door hinge 16 and lower hinge 18, and for example connectable to the shutface 162. Shutface 162 includes a port or aperture for allowing the drive shaft 42 to pass through the shutface 162, where such a port may be normally associated for allowing a door check link to pass therethough. As further shown in FIG. 2, this mounting of motor assembly 34 in manners as will be described herein disposes the power-operated actuator mechanism 22 of power closure member actuation system 20 in close proximity to the pivot axis B. The mounting of motor and geartrain assembly 34 adjacent to the pivot axis B of vehicle door 12 minimizes the effect that power closure member actuation system 20 may have on a mass moment of inertia (i.e., pivot axis A) of vehicle door 12, thus improving or easing movement of vehicle door 12 between its open and closed positions. Reducing the mass of the actuator and moving the mass of the actuator 22 closer to the pivot axis A reduces the mass of the door 14 and shifts the center of mass closer to the pivot axis C allowing for the motor 36 power and/or size to be reduced. In addition, as also shown in FIG. 2, the mounting of motor and geartrain assembly 34 closer to pivot axis A of vehicle door 12 allows power closure member actuation system 20 to be packaged in front of an A-pillar glass run channel and other internal door components and sheet metal panels associated with vehicle door 12 and thus avoids any interference with a glass window function of vehicle door 12. Put another way, power closure member actuation system 20 can be packaged in a portion of an internal door cavity 39 within vehicle door 12 that is not being used, and therefore reduces or eliminates impingement on existing hardware/mechanisms within vehicle door 12. Although power closure member actuation system 20 is illustrated as being mounted between the upper door hinge 16 and the lower hinge 18 of vehicle door 12, power closure member actuation system 20 can, as an alternative, also be mounted elsewhere within vehicle door 12 or even on vehicle body 14 without departing from the scope of the subject disclosure.

Power closure member actuation system 20 further includes the rotary drive mechanism that is rotatively driven by the power-operated actuator mechanism 22. As shown in FIG. 2, the rotary drive mechanism includes a drive shaft 42 interconnected to an output member of gearbox 38 of motor and geartrain assembly 34 and which extends and retracts from both sides of the gearbox 38. In addition, as an optional configuration although not expressly shown, a clutch such as a mechanical or electrical clutch may be disposed between the rotary output of gearbox 38 and first end 44 of drive shaft 42. The clutch may engage and disengage using any suitable type of clutching mechanism such as, for example, a set of sprags, rollers, a wrap-spring, friction plates, or any other suitable mechanism. The clutch may be provided to permit door 12 to be manually moved by the user between its open and closed positions relative to vehicle body 14. Such a clutch could, for example, also be located between the output of electric motor 36 and the input to gearbox 38. The location of this optional clutch may be dependent based on, among other things, whether or not gearbox 38 includes back-drivable gearing. In another possible configuration the power closure member actuation system 20 may not be provided with a clutch, which as a result reduces the mass of the power closure member actuation system 20 and of the door 14. Possibly the gearbox 38 may include "back-drivable" gearing to allow a user to manually move the door 14 whereby the gearing of the gearbox 38 will be induced to rotate. Possibly the gearbox 38 may alternatively include non-back-drivable preventing a user to manually move the door 14 whereby the gearing of the gearbox 38 cannot be induced to rotate by movement of the door 14, but rather only an activation of the motor 22 will cause the gearing of gearbox 38 to rotate to move the door 14. A brake mechanism which prevents anyone of the rotation of the motor 22, the gearbox 36, or movement of the drive shaft 42 may also not be provided with the power closure member actuation system 20 to also further reduce mass of the power closure member actuation system 20 and the door 14.

To accommodate angular motion due to swinging movement of door 12 relative to vehicle body 14, the power closure member actuation system 20 further includes a pivotal connection 45 disposed between the vehicle body 14 and the first end 44 of drive shaft 42. Second end 46 of drive shaft 42 is configured to reciprocate into and out of cavity 39 as drive shaft 42 is driven by the gearbox 38 in response to actuation of motor 36. Illustratively connection 45 is a pin and socket type connection allowing rotation of the drive shaft 42 about an axis C, which extends parallel or substantially parallel to pivot axis A of the door 14 and to the pivot axis B of the power-operated actuator mechanism 22. Translation of drive shaft 42 via operation of motor and geartrain assembly 34 functions to push the door 12 away from the vehicle body 14 when the drive shaft 42 is retracted from the cavity 39 and to pull the door 12 towards the vehicle body 14 when the drive shaft 42 is translated into the cavity 39. As a result, power closure member actuation system 20 is able to effectuate movement of vehicle door 12 between its open and closed positions by "directly" transferring a rotational force to the vehicle body 14 via linear translation of the driven drive shaft 42 in the illustrated example of FIG. 2. With motor and geartrain assembly 34 connected to vehicle door 12 adjacent to the shut face 162, second end 46 of drive shaft 42 may reciprocate and swing within cavity 39 as driven shaft 42 reciprocates R within gearbox 38. Based on available space within door cavity 39, second end 46 of drive shaft 42 may avoid collision with internal components within cavity 49 as the power-operated actuator mechanism 22 swings about axis B since for example the drive shaft 42 is retracted out of the cavity 39 as the door 12 is opened.

Figure 3B:
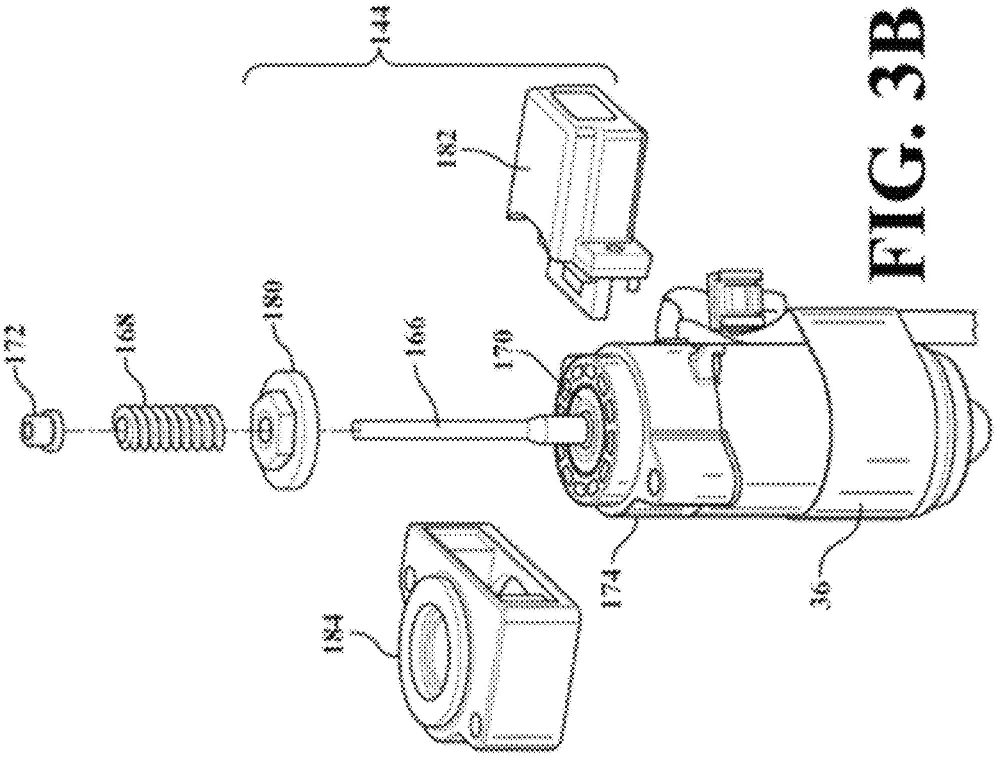
FIG. 3B illustrates an exploded view of components within the first powered actuator of FIG. 3A according to aspects of the disclosure.
Figure 3A:
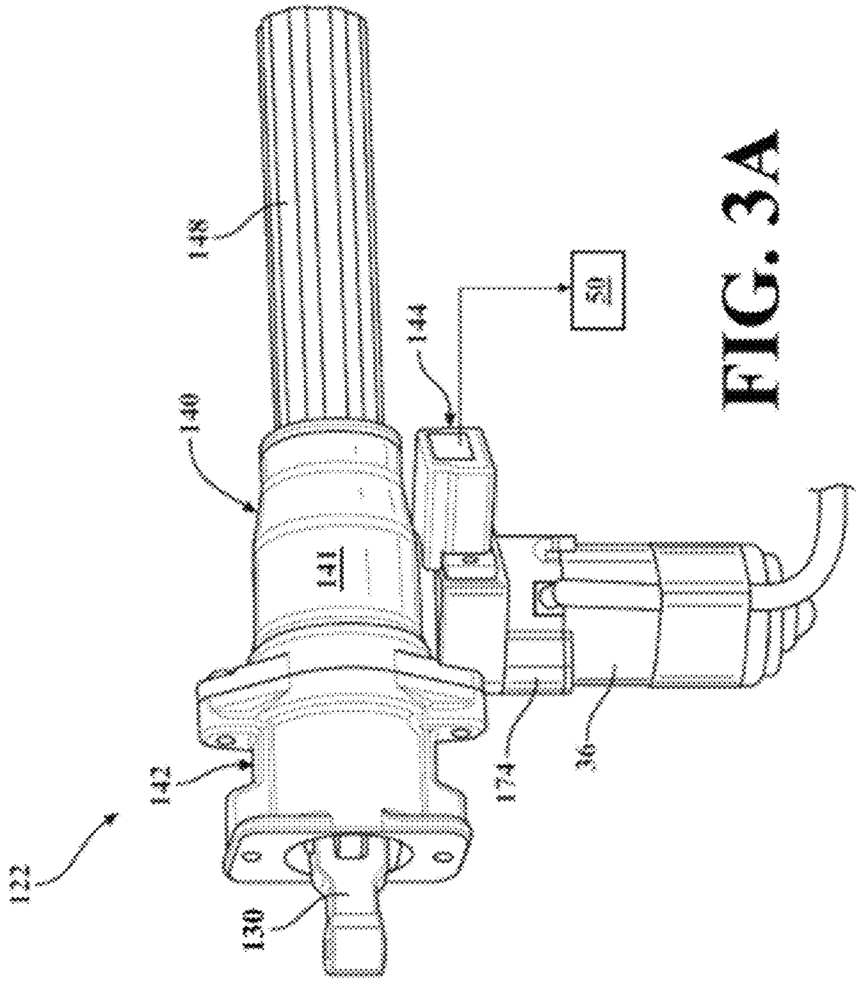
FIG. 3A illustrates a first powered actuator according to aspects of the disclosure.

FIGS. 3A-3B illustrate a second powered actuator 122 according to aspects of the disclosure. Specifically, FIG. 3B shows the electric motor 36 configured to rotate a driven shaft 166 for turning a worm gear 168. The driven shaft 166 is supported by a proximal bearing 170 and a distal bearing 172. When in an installed relationship with the door 12, shaft may run parallel or substantially parallel to the Y axis. The proximal bearing 170 is supported within a motor bracket 174 that is attached to an axial end of the electric motor 36 for connecting the motor to the gearbox 140. The proximal bearing 170 is shown as a ball bearing and the distal bearing 172 is shown as a plain bearing or a bushing. However, either of the bearings 170, 172 may be a different type of bearing, such as a plain bearing, a ball bearing, a roller bearing, or a needle bearing. FIG. 3B also shows internal components of the high-resolution position sensor 144, including a magnet wheel 180 that is coupled to rotate with the driven shaft 166 and which includes a plurality of permanent magnets. The magnet wheel 180 shown in FIG. 3B has six permanent magnets, but the magnet wheel 180 may include any number of magnets. The high-resolution position sensor 144 also includes a Hall-effect sensor 182 configured to detect a movement of the permanent magnets in the magnet wheel 180 thereby and to generate an electrical signal in response to rotary movement of the magnet wheel 180. The high-resolution position sensor 144 also includes a sensor housing 184 enclosing the magnet wheel 180 and all or part of the Hall-effect sensor 182.

Figure 4:
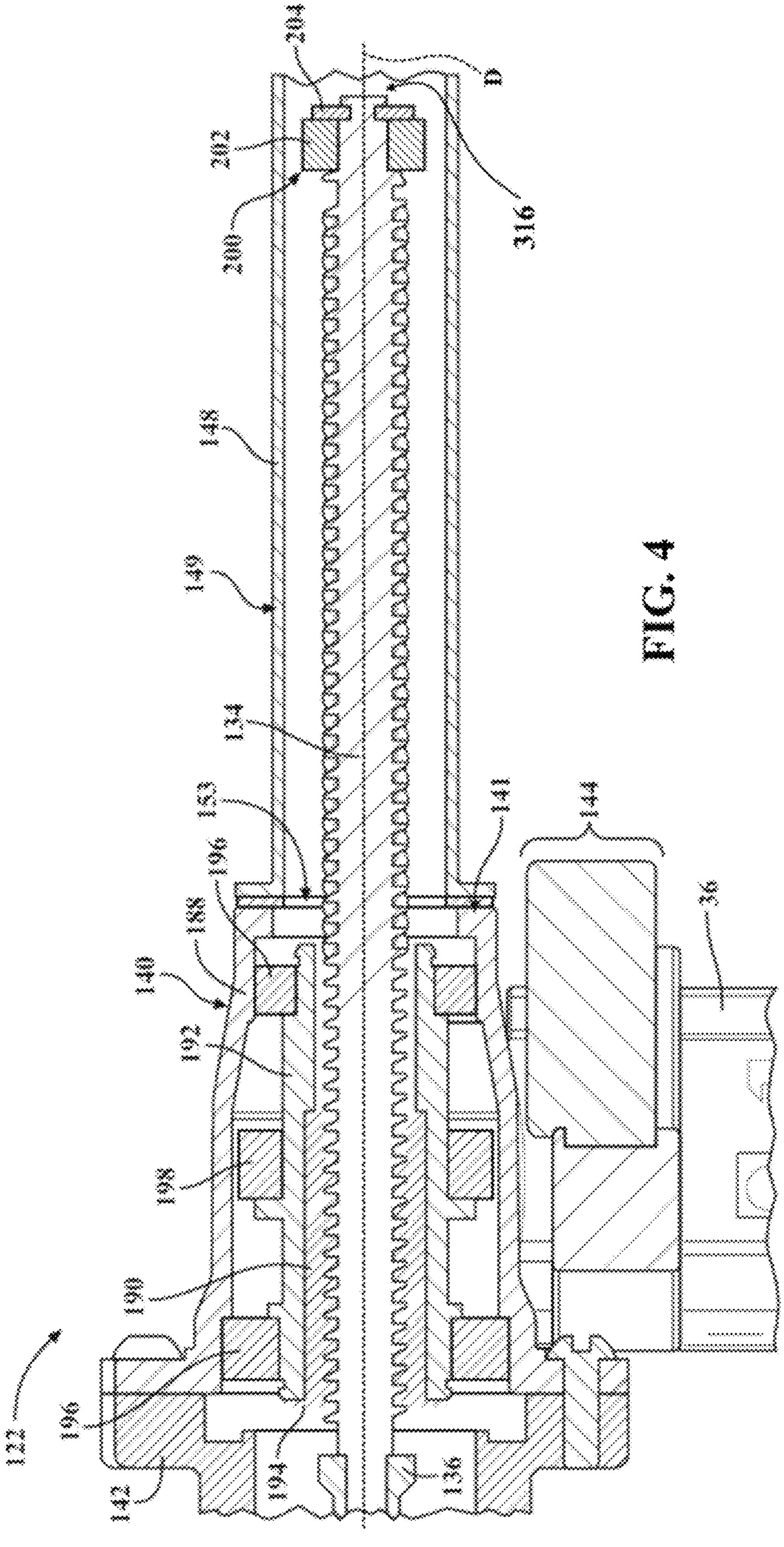
FIG. 4 illustrates a side partial cut-away view of the first powered actuator according to aspects of the disclosure.

FIG. 4 illustrates a partial cut-away view of the second powered actuator 122 according to aspects of the disclosure. FIG. 4 shows the general arrangement of the gearbox 140, which gearbox 38 described herein above would have a like configuration, including a gearbox housing 141 extending between an adapter 142 for fixedly connecting the gearbox 140 to the shutface 162 in a non-pivotal manner and a cover 148 for enclosing and sealing the second end 46 of drive shaft 42. Electric motor 36 is attached to the gearbox housing 141 for example via motor bracket 174 at a position below the gearbox 140 such that the motor shaft is 166 disposed perpendicular to an extensible member 134, as an example of drive shaft 42 described herein above. Adapter 142 is shown in FIG. 3A and FIG. 4 as being fixed against rotation with the housing 141, however adapter 142 may be modified as rotatable coupled by being pivotally connected to housing 141 about a pivot axis B as described herein with reference to pivotal connection 45 of powered actuator 22. Housing 141 is illustratively formed from a strong load bearing structure, formed from a material such as metal, which may be formed from casting. First powered actuator 22 and second powered actuator 122 are thus similar in construction yet differ with respect to the connection of the housing 141 to the vehicle door 12.

FIG. 4 also shows the internal details of the gearbox 140, including a lead nut 190 disposed around in threaded engagement with the extensible member 134 that is formed as a leadscrew. The leadscrew and lead nut configuration shown in FIG. 4 may provide a relatively low amount of backlash, thereby improving correlation between the detected position by the high-resolution position sensor 144 and the actual position of the closure. Such high precision detection may improve servo control of the powered actuator 22, 122. Extensible member 134 is driven by rotation of the nut 190 such that the nut 190 remains in position relative to the gearbox 140 while the extensible member 134 linearly translates when nut 190 is rotated so move relative to the gearbox 140. Gearbox 140 may be sealed in manners as described in International Patent Application No. CA2020051473.

The lead nut 190 is fixed within a torque tube 192 having a tubular shape. Specifically the lead nut 190 includes a flanged end 194 that protrudes radially outwardly and engages an axial end of the torque tube 192 at an end adjacent to the adapter 142. The torque tube 192 is held within a gearbox housing 141 by a pair of tube supports 196, with each of the tube supports 196 disposed around the torque tube 192 at or near a corresponding axial end thereof. One or both of the tube supports 196 may include a bearing, such as a ball bearing or a roller bearing. A worm wheel gear 198 is disposed around the torque tube 192 between the tube supports 196 and is fixed to rotate therewith. The worm wheel gear 198 is in meshing engagement with the worm gear 168 (shown on FIG. 3B), thus causing the torque tube 192 and the lead nut 190 to be rotated in response to the electric motor 36 driving the worm gear 168. Tube supports 196 assist with supporting the torque tube 192 against loads applied by the extensible member 42, 134 during operation of the powered actuator 22, 122 attempting to pivot the torque tube 198 relative to the housing 141, and as such pivoting of the powered actuator 22, 122 is constrained to pivoting about axis B while pivoting of gearing of gearbox 38, 140 is limited to movement of gears about fixed axis of rotation relative to the gearbox housing 141 for actuating the extensible member 42, 134, and not for allowing adjustment to the change in angle of the extensible member 42, 134 during opening and closing of the door 12 to avoid binding of the extensible member 42, 134 with the gearing of gearbox 38, 140.

The first powered actuator 122 shown in FIG. 4 also includes a travel limiter 200 disposed on an axial end of the extensible member 134 opposite (i.e. farthest away from) the linkage 130. The travel limiter 200 is configured to engage a part of the gearbox 140, such as the torque tube 192 for limiting axial extension of the extensible member 134, Specifically, the travel limiter 200 includes a bumper 202 of resilient material, such as rubber, having a tubular shape extending around the extensible member 134 adjacent the axial end thereof. A retainer clip 204 holds the bumper 202 in place on the axial end of the extensible member 134. The retainer clip 204 may include any suitable hardware including, for example, a washer, a nut, a cotter pin, an E-Clip, or a C-clip such as a snap ring.

Figure 5:
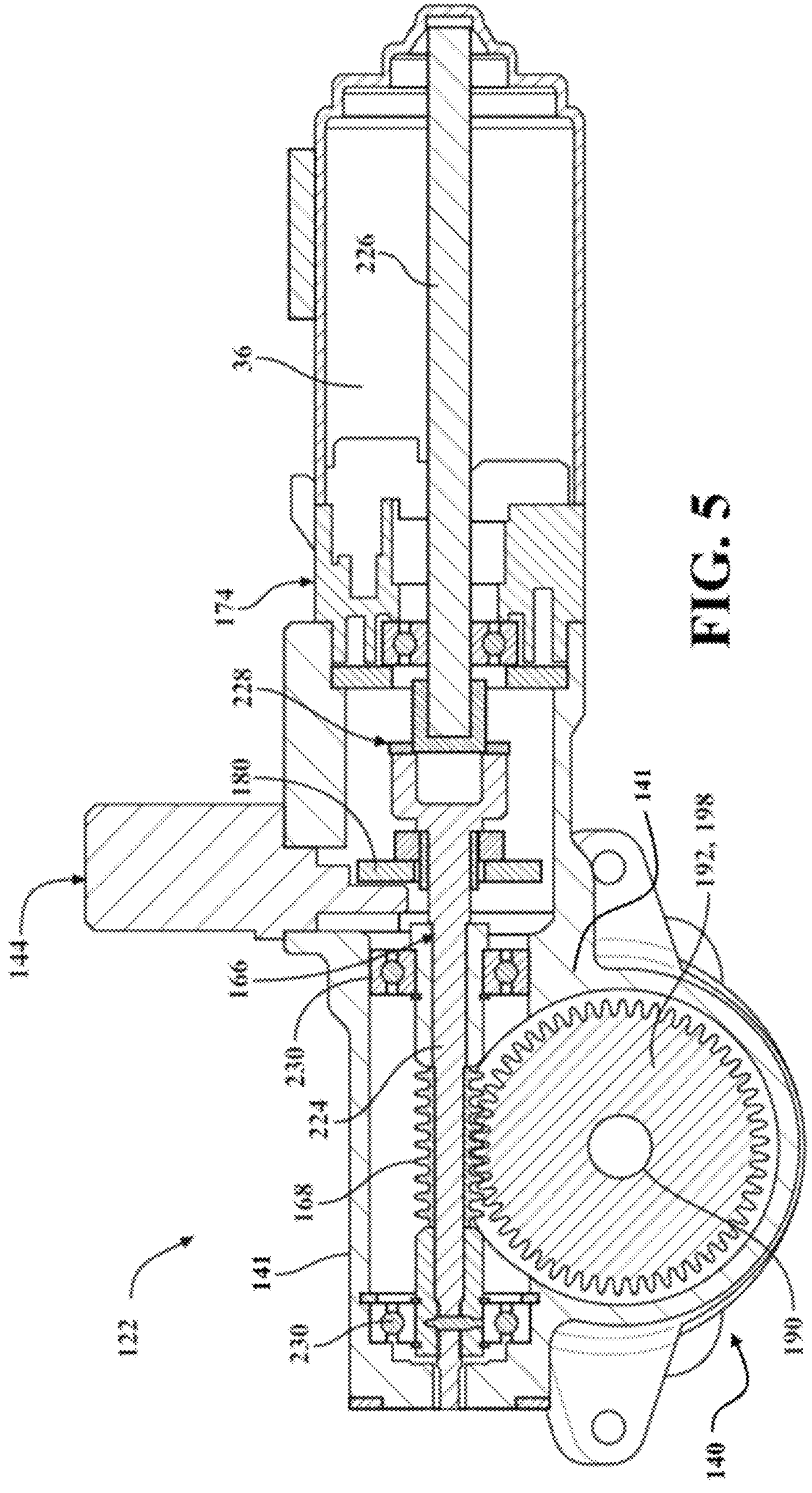
FIG. 5 illustrates front cut-away view of the first powered actuator according to aspects of the disclosure.

FIG. 5 illustrates a cut-away view of second powered actuator 122 according to aspects of the disclosure. Specifically, the plane of the cut-away view shown in FIG. 5 extends through the driven shaft 166 and a plane of the worm wheel 198. As shown in FIG. 5, the driven shaft 166 comprises a gearbox input shaft 224 that is coupled to a motor shaft 226 of the electric motor 36 via a coupling 228. The coupling 228 may be a fixed coupling, such as a splined connection, causing the gearbox input shaft 224 to rotate with the motor shaft 226. In accordance with the illustrated embodiment, no clutch is provided for disengaging the motor 36 to the gearing of the gearbox 140. Similarly no clutch may be provided between the gearbox 140 and the extensible member 134. A set of input bearings 230 holds the gearbox input shaft 224 on either side of the worm gear 168. Either or both of the input bearings 230 may be any type of bearing, such as a ball bearing, a roller bearing, etc.

In some embodiments, and as shown in FIG. 5, the torque tube 192 and the worm wheel 198 are formed as an integrated unit, with gear teeth formed on an outer perimeter, and with the lead nut 190 formed on an inner bore. In some embodiments, the torque tube 192 and the worm wheel 198 are formed as an integrated unit, and the lead nut 190 is a separate piece that is fixed to rotate therewith.

Figure 6A:
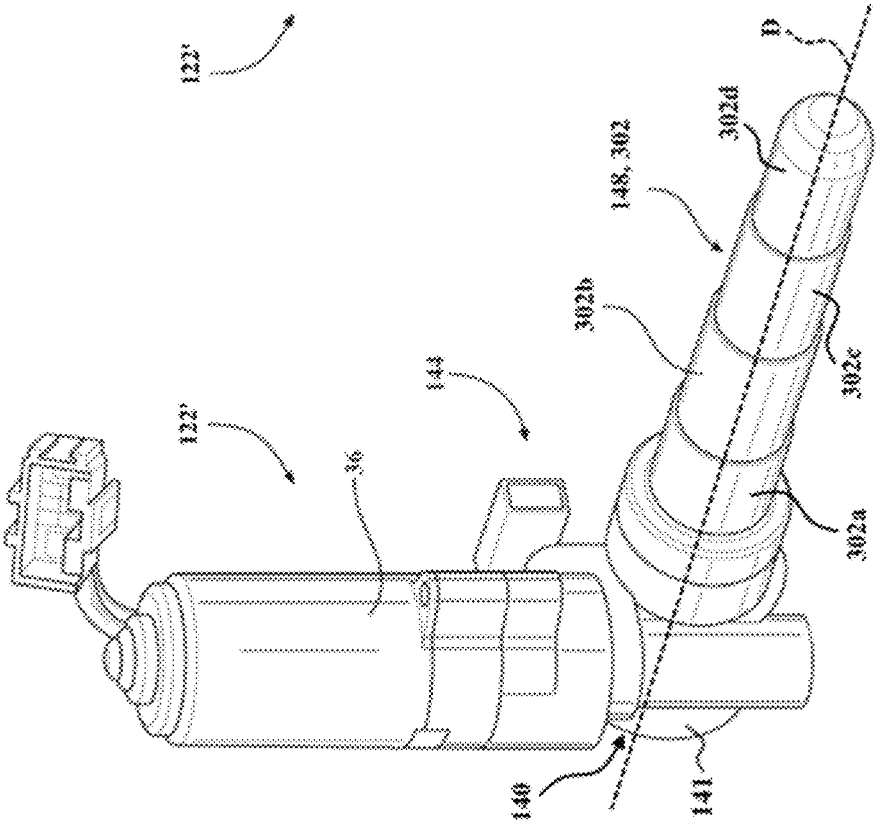
FIG. 6A illustrates a rear perspective view of a second powered actuator similar to first powered actuator of FIG. 3A with a telescoping cover in an expanded state according to aspects of the disclosure.
Figure 6B:
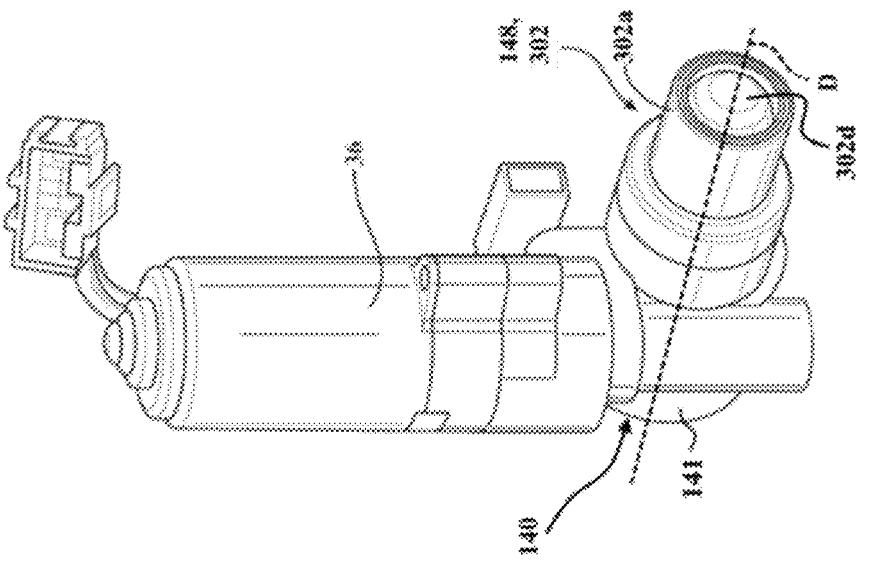
FIG. 6B illustrates a rear perspective view of the second powered actuator of FIG. 6A with a telescoping cover in a collapsed state according to aspects of the disclosure.

Now further referring to FIGS. 6A-6B which illustrate a powered actuator 122' according to aspects of the disclosure. Power actuator 122' is shown in a non-limiting embodiment, with it to be understood that any of the power actuator embodiments 22, 122 discussed above can be modified to include a mounting arrangement 300 and contamination cover (dust, fluid and the like), referred to hereafter as cover 302, as discussed hereafter, Illustratively associated with power actuator 122'. Mounting arrangement 300 and cover 302 work together to allow an electric motor 36 of power actuator 112' to be mounted immediately adjacent or proximate shut face 162, thereby reducing loads at mount points of mounting arrangement 300 and on surrounding closure panel 12 material, such as the shutface 162, and reducing the moment of inertia of closure panel 12, along with other benefits, as will become apparent in view of the discussion hereafter.

The powered actuator 122' includes features discussed above, including electric motor 36 and a gearbox 140 drivingly coupled to electric motor 36, with gearbox 140 being configured to drive an extensible member 134 between a retracted position, corresponding to a closed position of closure panel 12, and an extended position, corresponding to an open position of closure panel 12, as discussed above. An electromagnetic (EM) brake associated with the powered actuator is optional and is not shown, as discussed above, however configuring the motor 36 and geartrain of the power actuator 22, 122, 122' to function to brake the movement of the extensible member 134, such as when the motor 36 is not powered, provides for the elimination of an EM brake, or other brake device, reducing the mass of the power actuator 22, 122, 122'. Cover 302 is attached to the gearbox 140 and is configured to enclose the extensible member 134 to prevent contamination from reaching extensible member 134 from within internal cavity 39. The cover 302, as discussed above for cover 148, may help to prevent dust or dirt from fouling the extensible member 134 and/or to protect the extensible member 134 from contacting other components within the closure panel 12, such as inner and/or outer panels 95, 97 and/or a window 99. The cover 302 is formed as a hollow, telescopic (extendable and retractable along central longitudinal axis A of extensible member 134 and cover 302) tubular member, such as having a cylindrical geometry or otherwise, as discussed hereafter. The cover 302 is illustratively a light weight non-load bearing structure for supporting the weight of the gearbox 140 and motor 36, and in other words the cover 302 does not support the weight of the motor 36 and/or gearbox 140. Cover 302 may be made from rubber or plastic for example.

Figure 9:
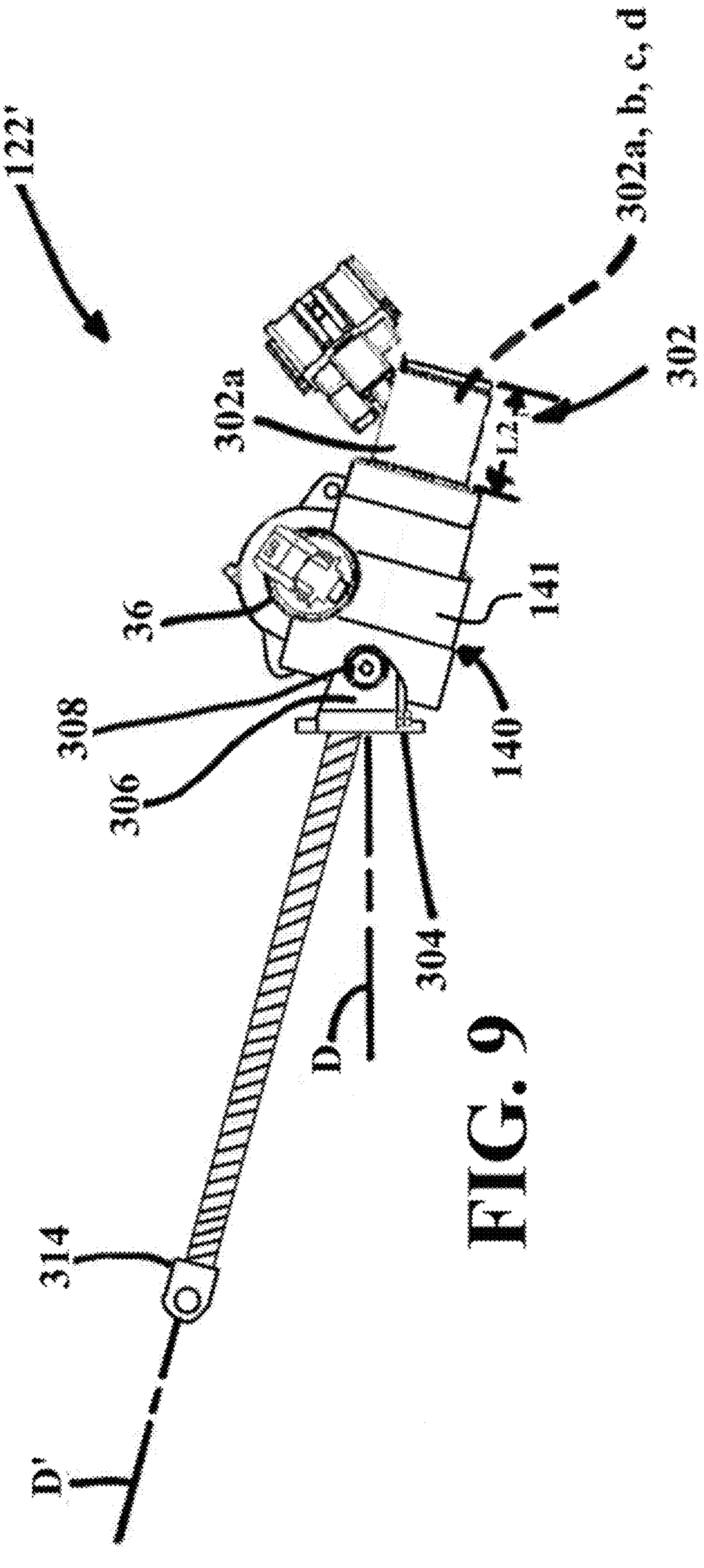
FIG. 9 illustrates a top view of the second powered actuator of FIG. 6A with the telescoping cover in an retracted state and the second powered actuator in a pivoted positioned relative to the position shown in FIG. 8, according to aspects of the disclosure.

Cover 302 is shown as having a plurality of cover sections, shown in a non-limiting embodiment as four cover sections 302*a*, 302*b*, 302*c*, 302*d*, being moveable relative to one another along axis D. Axis D is illustratively shown as perpendicular to axis B. It is to be understood that two or more sections could be used, depending on the application requirements. Cover sections 302*a*, 302*b*, 302*c*, 302*d* are configured in telescoping relation with one another, with cover section 302*a* being fixed to gearbox 140. Cover section 302*b* is directly coupled to cover section 302*a* for telescopic movement at least partially or fully inside of cover section 302*a*. Cover section 302*c* is directly coupled to cover section 302*b* for telescopic movement at least partially or fully inside of cover sections 302*b* and 302*a*. Cover section 302*d* is directly coupled to cover section 302*c* for telescopic movement at least partially or fully inside of cover sections 302*c*, 302*b* and 302*a*. Accordingly, cover sections 302*a*, 302*b*, 302*c*, 302*d* are axially nestable with one another, such that upon being fully nested (axially retracted), corresponding the closure panel 12 open position, the total length is the length of cover section 302*a* (FIG. 6B and FIG. 9) or slightly greater, such as if end portions of cover sections 302*b*, 302*c*, 302*d* extend slightly outwardly from cover section 302*a*, though not necessary. Extensible member 134 has a proximal end 316 fixed to a terminal end region of contamination cover 302, such as being fixed to an end region of end cover section 302*d*. As such, upon closure panel 12 being moved from the closed position toward and ultimately to the open position, proximal end 316 pulls on cover section 302*d*, which causes a cascading axial retraction of cover section 302*d* into cover section 302*c*, whereupon cover section 302*c* is caused to retract axially into cover section 302*b*, whereupon cover section 302*b* is caused to retract axially into cover section 302*a* (FIGS. 6B and 9), whereat the closure panel 12 is in the fully open position. When closure panel 12 is in its fully open position, extensible member 134 is able to extend along an axis D' that is oblique relative to axis D, such that extensible member 134 is pivoted in oblique relation relative to a plane P of mount bracket 304.

Therefore, when the extensible member 134 is retracted from the cavity 39, the cover 302 will adopt a collapsed configuration such that neither the cover 302 or the extensible member 134 collide with internal components within the cavity 39 during pivoting of the powered actuator 122' about pivot axis B. For example cover sections 302*d* may be attached to second end 46 such that the cover 302 is collapsed or expanded in response to movement of the extensible member 134.

Figure 7:
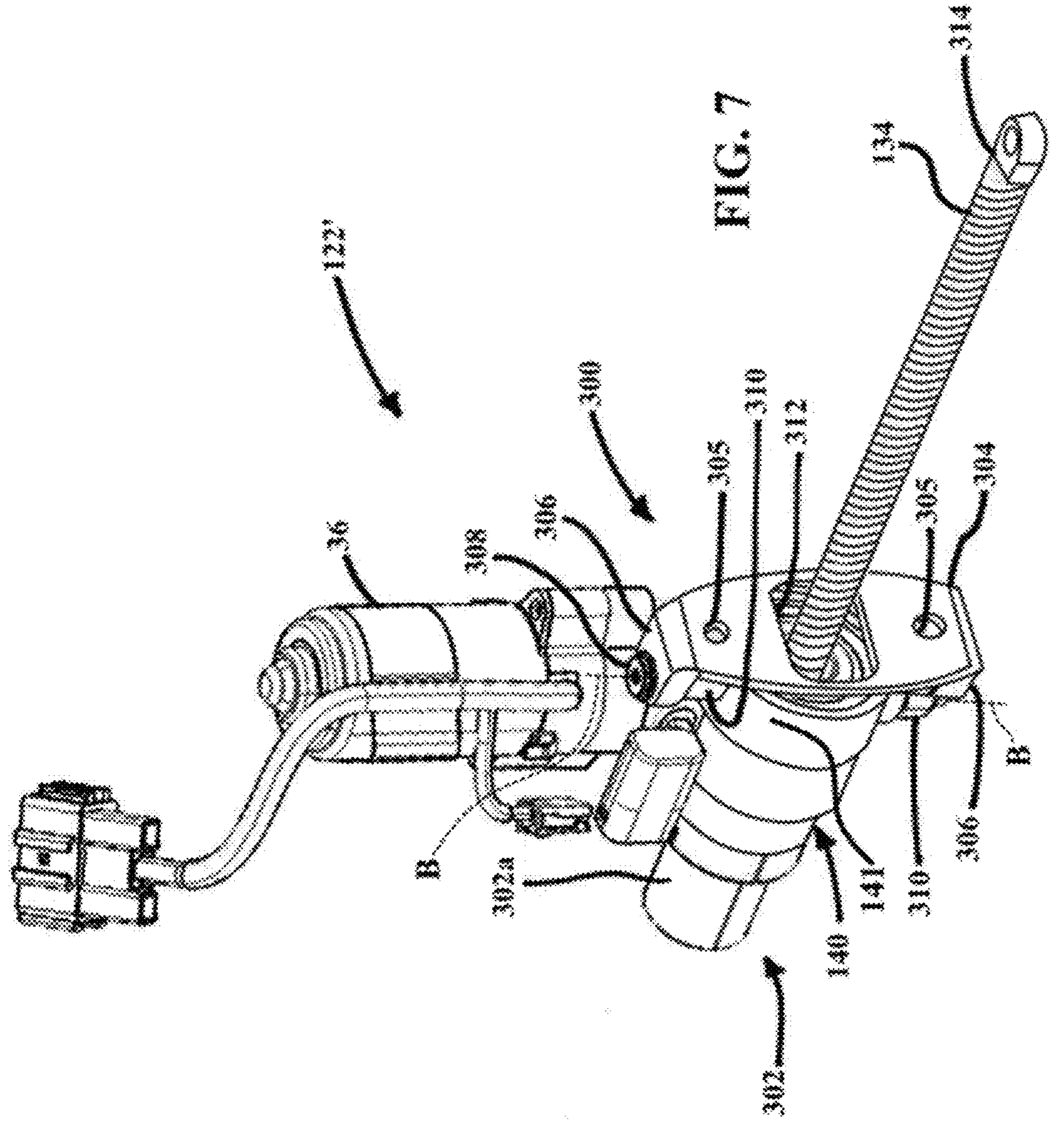
FIG. 7 illustrates a front perspective view of the second powered actuator of FIG. 6A according to aspects of the disclosure.
Figure 8:
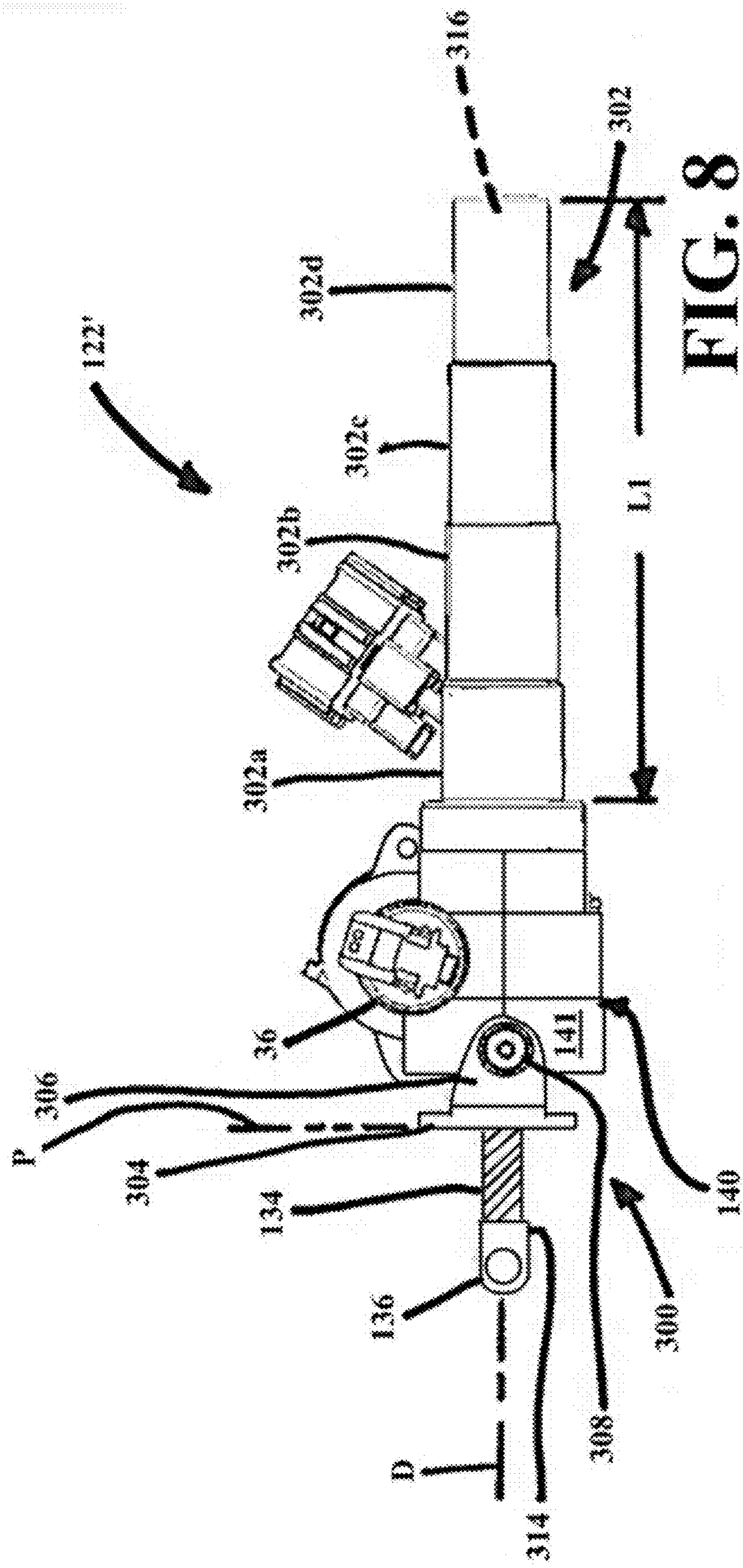
FIG. 8 illustrates a top view of the second powered actuator of FIG. 6A with the telescoping cover in an expanded state according to aspects of the disclosure.

Now referring additionally to FIG. 7 and FIG. 8, mounting arrangement 300 includes a door adaptor bracket, also referred to as mount bracket 304, configured for pivotal attachment to gearbox 140 and for fixed attachment to closure panel 12, thereby allowing mount bracket 304 and gearbox 140, with everything operably attached to gearbox 140 including the motor 36, to pivot relative to one another. Illustratively, mount bracket 304 is configured for pivotal attachment directly to gearbox 140 to allowing movement of the gearbox 140 only to pivot about axis B. Illustratively, mount bracket 304 is configured for pivotal attachment to an outer side perimeter of the gearbox. Therefore mount bracket 304 allows for a single axis of pivoting motion of the gearbox 140 thereabout. Mount bracket 304 is shown having a plurality (pair, by way of example and without limitation) of fastener openings 305 sized for receipt of fasteners, such as threaded bolts (not shown), to facilitate fixed attachment of mount bracket 304 to closure panel 12, such as to the shut face 162. It is to be recognized that an opposite arrangement is contemplated herein, such that mount bracket 304 can be configured for fixed attachment to gearbox 140 and for pivotal attachment to closure panel 12, thereby allowing mount bracket 304, gearbox 140, and everything operably attached to gearbox 140, to pivot relative to closure panel 12. Mounting arrangement 300 is an illustrative example of a pivotal connection 45. Mounting arrangement 300 may be configured to allow the powered actuator 122' to pivot about a single axis of rotation, such as about pivot axis B. Pivot axis B is illustratively parallel to the Y axis which is aligned with the downward directional pull due to gravity. Illustratively, only a single rotational axis is provided between the powered actuator 122' and the vehicle door 12. Illustratively, mount bracket 304 is configured as a U-shaped bracket. As shown in FIG. 7, to facilitate pivot attachment, mount bracket 304 has a pair of yokes, also referred to as ears or flanges 306, with axially aligned through openings configured for receipt of trunnions, such as can be provided by pins 308, therein. Pins 308 can be arranged for receipt in axially aligned receptacles bosses 310 extending from gearbox 140 (e.g. extending parallel to the axis B), though it is contemplated that pins could be formed as a monolithic piece of material with gearbox 140, if desired. Pins 308 provide for pivot movement of gearbox 140 relative to mount bracket 304. Flanges 306 support against movement of the gearbox 140 in the Y direction. For example lower boss 310 may be supported by bottom flange 306, and the weight of the powered actuator 122' supported thereby. Upper flange 306 may support upper boss 310 for example by the connection with the pin 308. Therefore the weight of the powered actuator 122', including the weight of the gearbox 140 and the motor 36 are transferred to the bracket 304, and not to the extensible member 134, as would be the case for example if the bosses 310 and pins 308 would be rotated ninety degrees such that pins 308 extend along the Z axis. Distributing the weight of the powered actuator 122' to the bracket 304 as opposed to the weight of the powered actuator 122', such as the weight from the gearbox 140 and/or motor 36 being supported by the extensible member 134 reduces the forces between the gearing of the gearbox 140 and the extensible member 134 which would tend to increase binding, increase friction between the nut tube and the teeth of the extensible member 134, and possibly cause flexing in the extensible member 134, which may require an increase in motor size to compensate for such forces. To allow unconfined pivot movement of gearbox 140 relative to mount bracket 304, mount bracket 304 has a clearance opening 312 therethrough. Clearance opening 312 is provided for receipt of extensible member 134 therethrough and is sized to allow free, unobstructed pivotal movement therein as closure panel 12 moves between its closed and open positions. Clearance opening 312 is shown to extend in the Z axis direction more so than in the Y-axis direction. Accordingly, extensible member 134 is assured of remaining in a clearance relation from mount bracket 304 as closure panel 12 is moved between the closed and open positions and as extensible member 134 translates through clearance opening 312 and pivots relative to mount bracket 304. Extensible member 134 is constrained to swing in the Z-direction only, due to the single pivot axis B.

With the ability of extensible member 134 to pivot relative to and within clearance opening 312 of mount bracket 304 about pivot B, a link bar 130 connected to the first end 42, shown in FIG. 3A, is not needed. As such, a distal end 314 of extensible member 134, similar to first end 42, can be pivotally fixed directly to vehicle body 14, with distal end 314 having an attachment through opening 136. As a result, the gearbox 140 and components attached thereto, including electric motor 36, can be moved immediately adjacent shutface 162, thereby providing reduced moment variations and enhanced haptic/servo control responses, particularly since the moment arm does not vary as closure panel 12 moves between the closed and open positions. Furthermore, by eliminating an additional axis of pivoting associated with the pivotal connection between the powered actuator 122' and the shutface 162, such as an axis of rotation extending in the Z direction and providing only a single axis of rotation, such as axis of rotation B, additional complex pivotal coupling configurations can be avoided which further eliminates distance creating components between the shut face 162 and the gearbox 140, reduces the mass of the powered actuator 122', and allows the mass of the powered actuator 122' to be brought closer to the door pivot axis C. Motor 36 size can be therefore reduced, the braking ability and response time of the motor 36 can be improved due to less mass generating inertia away from the pivot axis C. Furthermore, providing a gearbox 140 as a structural support for other components reduces the binding of the extensible member 134 with the gearing of the gear box 140, as well as other loading on the gears of the gear box 140 since all the gearing is supported by load bearings as described herein.

Figure 11:
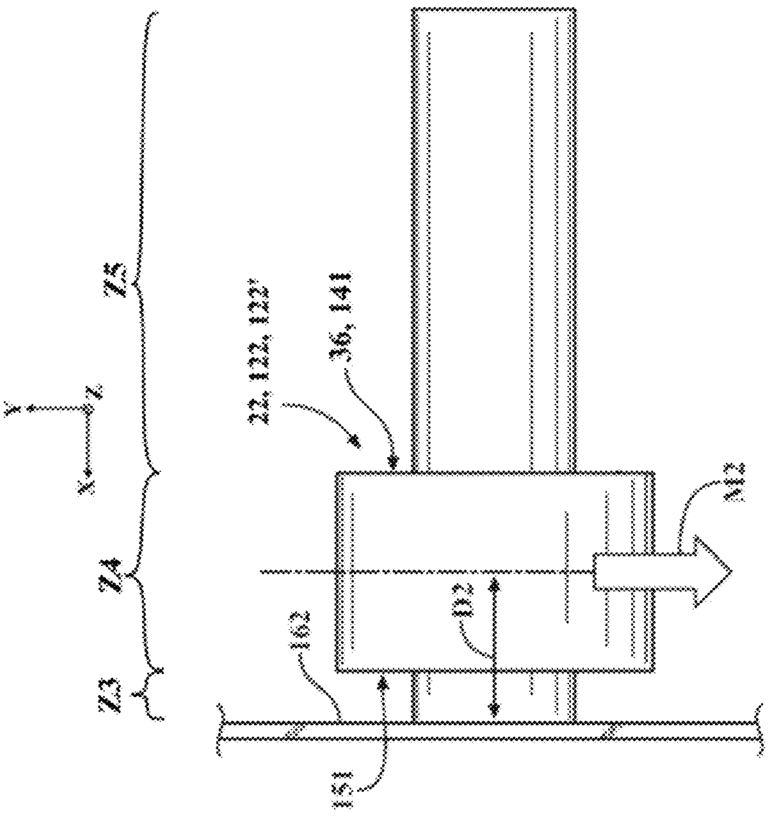
FIG. 11 illustrates a schematic block diagram of components within a powered actuator according to aspects of the disclosure.
Figure 10:
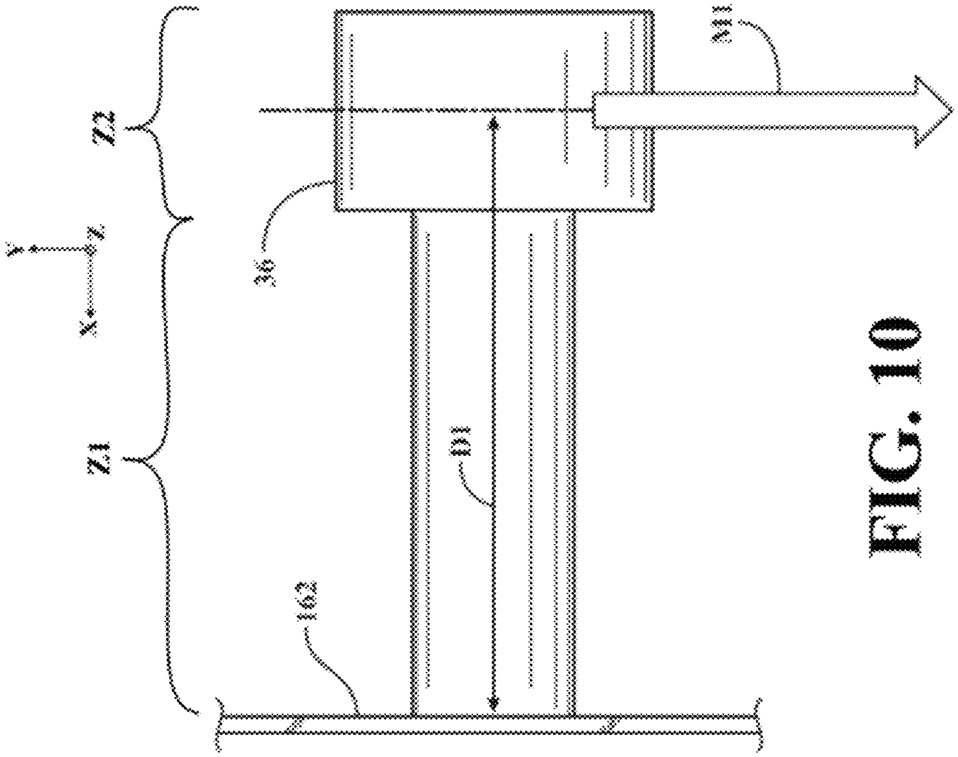
FIG. 10 illustrates a schematic block diagram of components within a powered actuator of the prior art.

Referring now to FIG. 10 and FIG. 11, there is illustrated contrasting configurations of power actuators for moving a vehicle door 12. FIG. 10 shows power actuators having within a zone 1, also referred to as Z1, components positioned between the shut face 162 and the motor 36 and geartrain such as multiple pivotal couplings (e.g. more than one pivot point that allow the motor 36 to pivot at least about the Z and Y axis), overlapping tubes where one of the tubes functions as an extendable member while another support tube overlaps with the extending tube in order to both support and guide the extending tube and to support the weight of any other drive components such as a clutch, motor, geartrain, brake etc. connected via the support tube connected to the shutface 162. Known devices have motors, clutches, brakes, leadscrew connections in zone 2, also referred to as Z2. Such components are supported by a support member, such as a tube or fixed non-pivotal bracket provided in Zone 1, which are themselves required to have structural strength tending increasing the mass of the actuator. As a result, such heavier components are positioned at a distance D1 away from the shutface 162 shifting the center of mass of the vehicle door 12 away from the shutface 162. FIG. 11 shows the configuration of an actuator 22, 122, 122' according to aspects of this present disclosure having a zone 3, also referred to as Z3, having a single pivotal connection or coupling without further multi-pivotal components nor any other support brackets or tubes. The gearbox 140 of the actuator 22, 122, 122' is directly coupled to the single pivotal connection allowing reduction in the weight of any other intervening components to allow the gearbox 140 to be further moved towards the shutface 162. Illustratively the distance D2 is resultantly less than the distance D1. Illustratively, motor 36 is also provided inline with the gearbox 140, or adjacent extending in the Z direction such that weight associated with the motor 36 does not extend beyond a distance greater than D2 for example. Furthermore, actuator 22, 122, 122' is provided without clutches or brakes devices in zone 3 or zone 4 or zone 5, further minimizing any shifting of the center of mass of the actuator 22, 122, 122' away from the shutface 162. Furthermore, the extensible member 134 moves through the shutface 162 further moving the mass of the actuator 22, 122, 122' towards the shutface 162, as the extensible member 134 leaves or almost leaves zone 5 (Z5). Illustratively the distance D2 is less than the distance D1.

Figure 12:
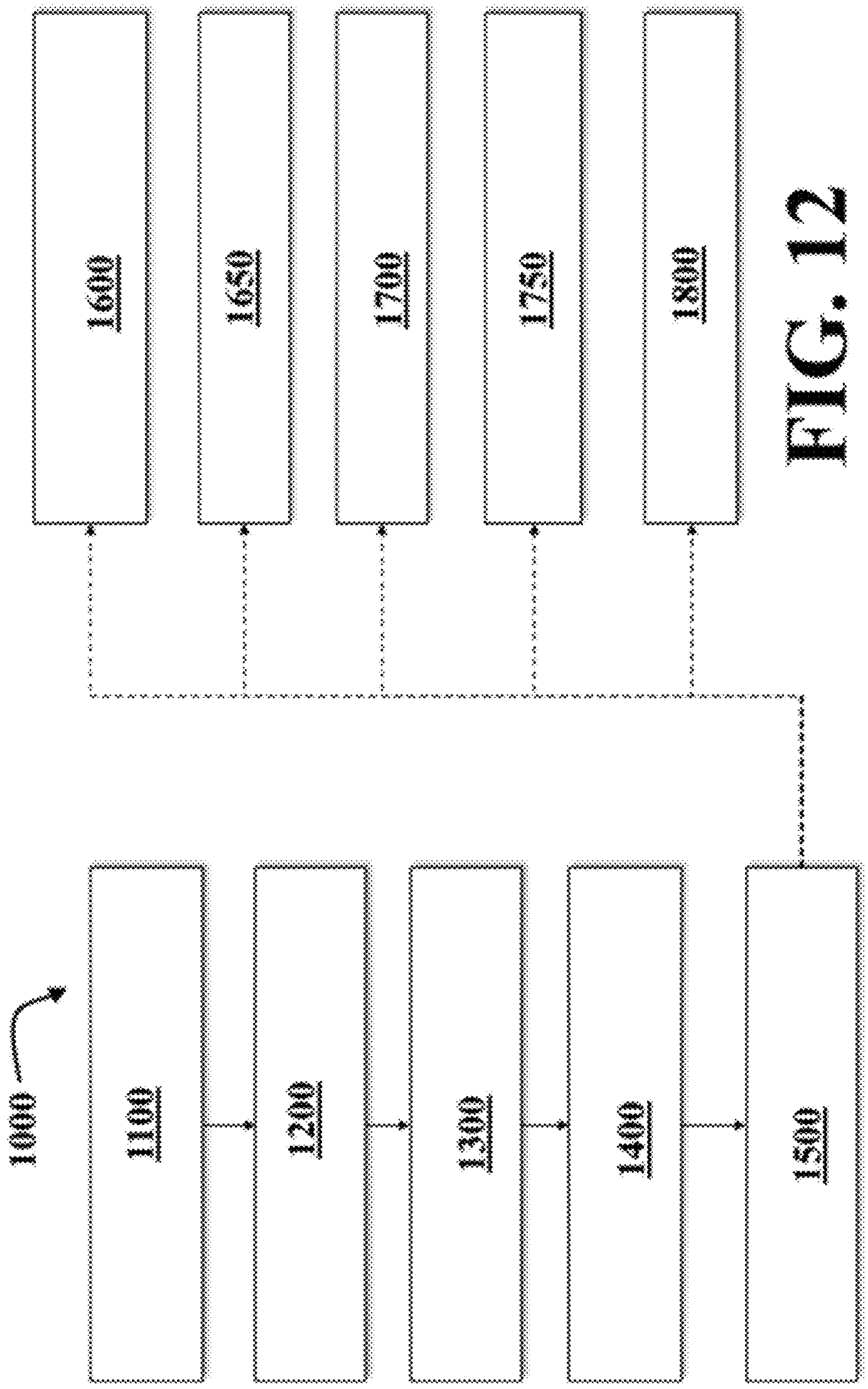
FIG. 12 is a flow diagram illustrating a method of constructing a powered actuator for moving a closure panel of a motor vehicle between a closed position and an open position in accordance with another aspect of the disclosure.

In accordance with another aspect of the disclosure, FIG. 12, a method 1000 of constructing a powered actuator **122*h* for moving a closure panel 12 of a motor vehicle 10 between a closed position and an open position is provided. The method 1000 includes a step 1100 of configuring an electric motor 36 to drive a driven shaft 166 and coupling a gearbox 140 to the driven shaft 166. A step 1200 of disposing an extensible member 134 through the gear box 140 with the extensible member 134 extending to a proximal end 316 on one side of the gearbox 140 and to a distal end 314 on an opposite side of the gearbox 140 and providing the proximal end 316 being configured to be pivotably coupled to one of a vehicle body 14 or the closure member 12. Further, a step 1300 of configuring the extensible member 134 to move between a retracted position (FIG. 8), corresponding to the closed position of the closure panel 12, and an extended position (FIG. 9), corresponding to the open position of the closure panel 12, in response to rotation of the driven shaft 166. Further yet, a step 1400 of enshrouding at least a portion of the extensible member 134 extending between the gearbox 140 and the distal end 314 with a contamination cover 302. And, a step 1500 of configuring the contamination cover 302 to move between an axially extended state having a first length L1 (FIG. 8) while the extensible member 134 is in the retracted position and an axially retracted state having a second length L2 (FIG. 9) while the extensible member 134 is in the extended position, with the first length L1 being greater than the second length L2**.

In accordance with a further aspect, the method 1000 can include a step 1600 of providing the contamination cover 302 having a plurality of cover sections **302*a*, 302*b*, 302*c*, 302*d*** configured to move telescopically relative to one another as the contamination cover moves between the axially extended state and the axially retracted state.

In accordance with a further aspect, the method 1000 can include a step 1650 of configuring the extensible member 134 for attachment to one of the vehicle body 14 and the closure member 12 without incorporating an intermediate linkage between the extensible member 134 and the one of the vehicle body 14 and the closure member 12.

In accordance with a further aspect, the method 1000 can include a step 1700 of pivotally attaching a mount bracket 304 to the gearbox 140 to provide for pivotal movement of the gearbox 140 relative to the mount bracket 304, with the mount bracket 304 being configured for direct attachment to one of the closure member 12 and the vehicle body 14.

In accordance with a further aspect, the method 1000 can include a step 1750 of providing the mount bracket 304 having a clearance opening 312 and extending the extensible member 134 therethrough, wherein the extensible member 134 can be configured to pivot within the clearance opening 312 as the extensible member 134 moves between the extended and retracted positions.

In accordance with a further aspect, the method 1000 can include a step 1800 of pivotally attaching the mount bracket 304 to one side of the gearbox 140, fixing one of the cover sections **302*a* directly to an opposite side of the gearbox 140, and fixing another one of the cover sections 302*d* to the distal end 314 of the extensible member 134**.

Figure 13:
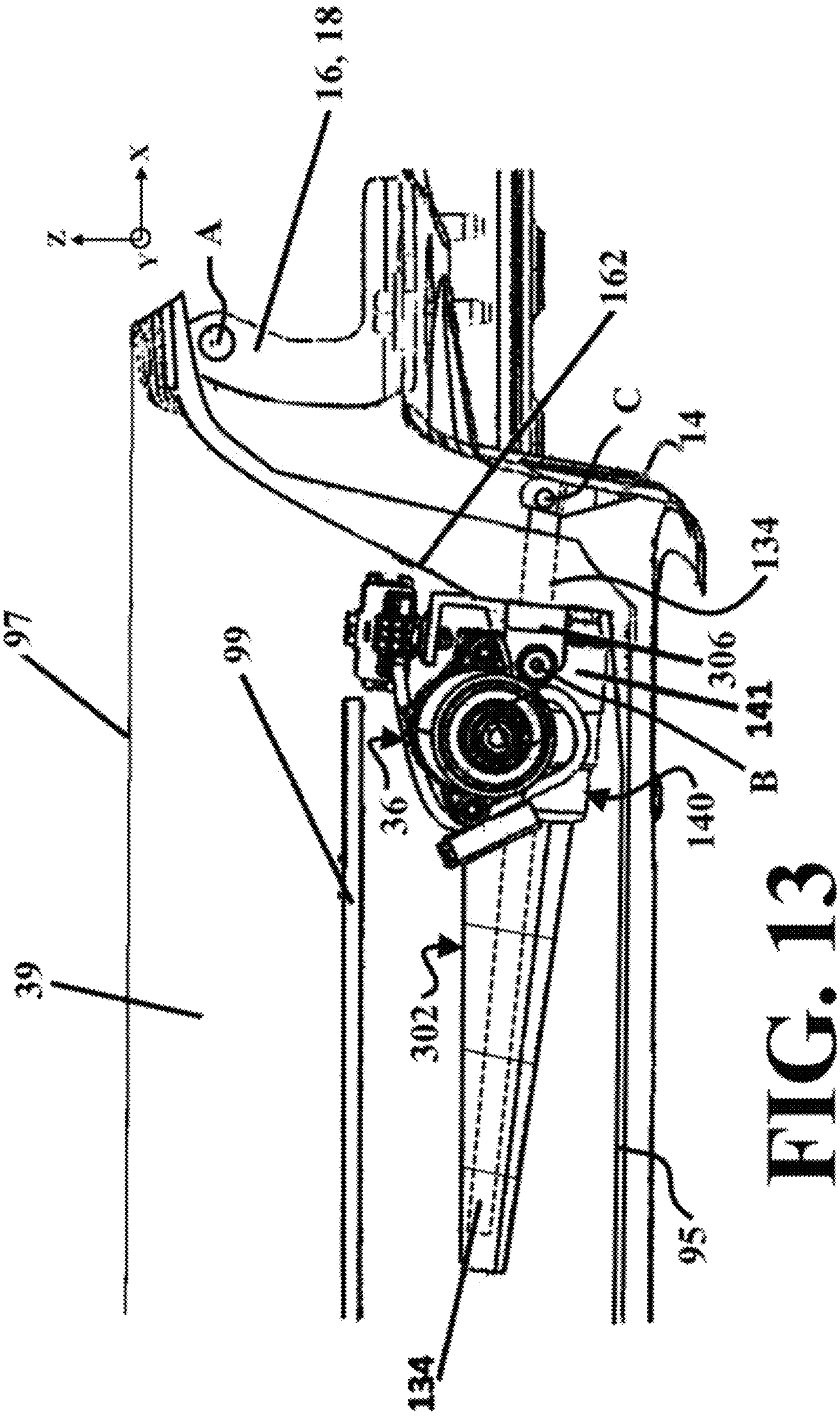
FIG. 13 is a top partial sectional view of a closure panel in a closed position with the extensible member in a retracted position but extending substantially with in the inner cavity of the closure panel and having a shroud or cover in an extended position, also showing a window pane and inner panel adjacent the extensible member in a non-interference manner.

Now referring to FIGS. 13 and 14 in addition to FIGS. 1 to 12, illustrated is operation of the powered actuator 20, 122, 122' moving the door 12 from a closed position in FIG. 13 to an opened position in FIG. 14. In FIG. 13, the extensible member 134 is substantially extended within the door internal cavity 39 and extending substantially parallel to the inner 95 and outer panels 97 of the door 12 in a non-interfering orientation with adjacent internal components such as the window pane 99, or glass run channels as examples. In FIG. 14, the extensible member 134 is substantially extended out of the door internal cavity 39 as a result of actuation of the motor 36 to open the door 12 such that an angular change in the extensible member 134 as a result of a rotation of the gearbox housing 141 about axis B and the retraction of the extensible member 134 out of the cavity 39 does not cause interference of the power actuator 20, 122, 122' with any of the door 12 components e.g. inner panel 95 or window 99 since. Furthermore, since the shroud or cover 302 has been collapsed in response to the retraction of the extensible member 134 out of the cavity 29, cover 302 will also not be caused to collide with any internal door hardware or panel during swinging motion PA of the power actuator 20, 122, 122'. Also, since the gearbox housing 141 is positioned in closer proximity to shutface 162, the length of the extensible member 134 can be shortened further reducing the mass of the power actuator 20, 122, 122' and further shifting the center of mass of the door 12 towards the pivot axis A, and the gearbox housing 141 and the power actuator 20, 122, 122' in general can be pivoted within the inner cavity without interference with other internal door components. In other words, the foot print of the power actuator 20, 122, 122' within the door cavity 39 decreases when the door 12 is moved from the closed position to the opened position allowing for a larger angular change of the extensible member 134 than if a footprint of a housing or cover of the extensible member not configured to collapse as the shroud 134 length remains constant within the door cavity 29 and therefore, larger door opening angles result and/or improved door leverage and/or a reduction in cross sectional width of the closure panel 12 is possible since the angular rotation of the power actuator 20, 122, 122' is not restricted by contact with adjacent door components. Additionally providing a pivotal coupling between the vehicle closure panel 12 and the gearbox housing 141, and for example a direct coupling to the structural housing of the gearbox 140, without a coupling to an intermediary tubular housing configured for supporting reciprocation of an extensible actuation member as in known devices eliminates components tending to increase the distance D2 more towards a distance D1 away from the shut face 162. With such a direct coupling of a pivotal connection to the gearbox housing 141, the power actuator 20, 122, 122' is supported at a closer position to the shut face 162 without a tubular housing required to be sufficient strong to resist bending loads as a result of the electric motor being position at an opposite end away from the coupling with the shut face 162 thereby reducing components and component weight e.g. due to the increase in the tubular housing and tubular housing thickness for strength, reducing vertical loading to the coupling 45 and to the shutface 162, as well as bringing the weight of the vehicle door 12 closer to the hinge line (e.g. about pivot axis A) beneficial for improving performance of the power actuator 20, 122, 122' due to less weight of the door 12 being away from the hinges 16, 28 having to be moved or stopped by the power actuator 20, 122, 122'. Additionally, a single structural component in the form of the gearbox housing 141 can be designed to support both the loading from the weight of the electric motor 36, the weight of the gearing enclosed within the gearbox housing 141 supported thereby and the side loads of the extensible member 134 acting on the nut 192 during opening and closing of the door 12.

Now further referring to FIG. 15 and FIG. 16 which illustrate a powered actuator 122" according to aspects of the disclosure. Power actuator 122" is shown in a non-limiting embodiment, with it to be understood that any of the power actuator embodiments 22, 122, 122' discussed above can be modified to include two contamination covers (dust, fluid and the like), referred to hereafter as internal cover 302" and external cover 303" as discussed hereafter, and illustratively associated with power actuator 122". Covers 302", 303" work together to fully enclose the extensible member 134" to prevent debris, dust, dirt, contaminants and like from entering into contact with the threads of the extensible member 134", which is driven for reciprocation within the gearbox 140" in manners as described herein above with reference to extensible member 134 for example. Internal cover 302" is shown attached to one side of the housing 141", for example by a press fitted engagement with the housing 141" (see FIG. 17), and is illustratively configured as a collapsible bellows, and is shown in a collapsed state in FIG. 15 corresponding to a door open position when the extensible member 134" is extended from the shutface 162, and is shown in an expanded state in FIG. 16 corresponding to a door close position when the extensible member 134" is extending into the cavity 39. Housing 141" further has attached thereto a motor 36", similar to motor 36 described herein above, yet now extending upwardly from the housing 141". A proximal end of the extensible member 134", similar to proximal end 316 of the extensible member 134 described herein above, may be coupled to the internal cover 302". External cover 303" is shown attached to the other opposite side of the housing 141" and is illustratively configured as a collapsible bellows, and is shown in an expanded state in FIG. 15 corresponding to a door open position when the extensible member 134" is extended from the shutface 162, and is shown in an collapsed state in FIG. 16 corresponding to a door close position when the extensible member 134" is extending into the cavity 39. A distal end 314" of the extensible member 134", similar to proximal end 314 of the extensible member 134 described herein above, may be coupled to the internal cover 302" such that the external cover 303" changes state in response to the movement of the extensible member 134". External cover 303" is shown attached to one side of the housing 141" using a boot 143" having an inner aperture to receive the external cover 303" and which is further configured to connect with, such as snap into engagement or by a threaded engagement (see FIG. 17), with the housing 141" so as to secure the external cover 303" to the housing 141". External cover 303" fully encloses the extensible member 134" to prevent debris, dust, dirt, contaminants and the like originating from the external environment outside the cavity 39 from entering into contact with the threads of the extensible member 134" both when extended and retracted relative to the gearbox 140". Covers 302", 303" may be formed from a resilient material, such as a flexible plastic, or flexible rubber as non-limiting examples.

Now referring additionally to FIG. 17, there is shown a cross-sectional view of the powered actuator 122" illustrating a support arrangement for the torque tube 192", similar to nut tube 192 described herein above. Support arrangement for the torque tube 192" includes a bushing **196*a*" as a nut support at one end of the torque tube 192" for supporting rotation of the torque tube 192" with the housing 141", and includes a bearing 192*b*" for supporting rotation of the torque tube 192" with the housing 141" at an opposite end of the torque tube 192". Bearing 192*b*" is shown to include ball bearings provided between inner ring 199" coupled to the torque tube 192" and outer ring 197" coupled to the housing 141". Prevention of axial movement of bearing 192*b*" is achieved by providing a first nut 193" threaded to an interior surface of the housing 141" for abutting against or positioning adjacent to the outer ring 197" to prevent axial movement of the outer ring 197", and by providing a second nut 195" threaded to an outer surface of the torque tube 192" for abutting against or positioning adjacent to the inner ring 195" to prevent axial movement of the outer ring 195". As a result of constraining the axial movement of the bearing 192*b*" during back driving of the torque tube 192" caused movement of the extensible member 134" due to manual movement of the door, the back driveability of the powered actuator 122"** is improved.

Clearly, changes may be made to what is described and illustrated herein without, however, departing from the scope defined in the accompanying claims. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A powered actuator for moving a closure panel of a motor vehicle between a closed position and an open position relative to a vehicular body, the powered actuator comprising:

a housing defining an interior cavity;

a mounting arrangement pivotally coupling the housing to the closure panel;

a gearset supported within the interior cavity of the housing;

an electric motor driving the gearset; and an extensible member translated by the gearset in response to actuation of the electric motor, the extensible member having a first end extending through a first end of the housing and a second end extending through a second end of the housing, the second end of the extensible member being configured for pivotal connection to the vehicle body, wherein the extensible member translates relative to the housing and the mounting arrangement between a retracted position, corresponding to the closed position of the closure panel, and an extended position, corresponding to the open position of the closure panel, wherein the mounting arrangement includes a pivotal coupling positioned between the second end of the housing and the closure panel, and wherein the pivotal coupling interconnects the housing to the closure panel such that the housing pivots relative to the closure panel in response to movement of the closure panel between the open position and the closed position.

2. The powered actuator of claim 1, wherein the pivotal coupling interconnects the housing to the closure panel via at least one pivot attachment.

3. The powered actuator of claim 2, wherein the pivotal coupling includes a mount bracket fixedly attached to the closure panel, wherein the pivotal coupling is pivotally attached to the housing via the at least one pivot attachment.

4. The powered actuator of claim 1, wherein the closure panel has an inner panel and an outer panel defining an inner cavity, wherein the pivotal coupling includes a mount bracket configured for fixed attachment to an inner shut face surface extending between the inner and outer panels of the closure panel and located within the inner cavity, and wherein the mount bracket is pivotally attached to the housing such that the powered actuator is pivotable within the inner cavity relative to the inner shut face surface.

5. The powered actuator of claim 4, wherein the pivotal coupling further includes include a first pivot attachment and a second pivot attachment, and wherein the first and second pivot attachments are configured to pivotally couple the mounting bracket to housing and are aligned to permit pivoting movement of the housing relative to the closure panel about a common pivot axis.

6. The powered actuator of claim 5, wherein the first and second pivot attachments are located adjacent to the second end of the housing.

7. The powered actuator of claim 4, wherein the mount bracket includes a plate configured for fixed attachment to the inner shut face surface and having a clearance opening, wherein the extensible member extends within the clearance opening, and wherein the clearance opening is aligned with a port provided in the inner shut face surface, wherein the extensible member extends through the port.

8. The powered actuator of claim 7, wherein the mount bracket includes a first flange extending transversely from a first end of the plate and a second flange extending transversely from a second end of the plate, wherein the first flange is pivotally coupled via a first pivot attachment to the housing and the second flange is pivotally coupled via a second pivot attachment to the housing such that the housing pivots relative to the closure panel about a pivot axis defined by the first and second pivot attachments.

9. The powered actuator of claim 8, wherein the first pivot attachment includes a first pivot mount extending from the housing and a first pivot pin pivotably coupling the first pivot mount to the first flange, wherein the second pivot attachment includes a second pivot mount extending from the housing and a second pivot pin pivotably coupling the second pivot mount to the second flange, and wherein the first pivot pin and the second pivot pin are coaxially aligned along the pivot axis.

10. The powered actuator of claim 1, wherein the pivotal coupling comprises a mount bracket fixedly attached to an inner shut face surface within an inner cavity formed within the closure panel, and a pair of coaxially aligned pivot attachments configured to pivotally attach the mounting bracket to the housing.

11. The powered actuator of claim 10, wherein the mount bracket defines a clearance opening, and wherein the extensible member translates through the clearance opening in response to movement of the closure panel between the open and closed positions and pivoting movement of the housing relative to the mount bracket.

12. A powered actuator for moving a closure panel of a motor vehicle between a closed position and an open position relative to a vehicular body, the powered actuator comprising:

a housing defining an interior cavity;

a mounting arrangement pivotally coupling the housing to the closure panel;

a gearset supported within the interior cavity of the housing;

an electric motor driving the gearset;

an extensible member translated by the gearset in response to actuation of the electric motor, the extensible member having a first end extending through a first end of the housing and a second end extending through a second end of the housing, the second end of the extensible member being configured for pivotal connection to the vehicle body wherein the extensible member translates relative to the housing and the mounting arrangement between a retracted position, corresponding to the closed position of the closure panel, and an extended position, corresponding to the open position of the closure panel; and a lead nut supported for rotation within the interior cavity of the housing and drivingly connected to the extensible member, wherein rotation of the gearset via actuation of the electric motor causes rotation of the lead nut, wherein rotation of the lead nut results in non-rotary translation of the extensible member relative to the housing and the closure member.

13. A powered actuator for moving a closure panel of a motor vehicle between a closed position and an open position relative to a vehicle body, the powered actuator comprising:

a gearbox housing defining an interior cavity extending between laterally-spaced first and second end walls;

a gearset supported within the interior cavity of the gearbox housing;

an electric motor mounted to the gearbox housing and having a motor shaft driving the gearset;

a pivotal coupling operably disposed between the second end of the gearbox housing and the closure member, the pivotal coupling configured for pivotally coupling the housing to the closure panel; and an extensible member non-rotatably translated by the gearset in response to actuation of the electric motor, the extensible member having a first end extending through the first end wall and a second end extending through the second end wall, wherein the second end is configured for pivotal attachment to the vehicle body, wherein the extensible member translates relative to the gearbox housing and the pivotal coupling between a retracted position, corresponding to the closed position of the closure member, and an extended position, corresponding to the open position of the closure member.

14. The powered actuator of claim 13, wherein the pivotal coupling includes a mount bracket fixed to the closure panel, and first and second coaxially aligned pivot attachments configured to pivotably attach the second end wall of the gearbox housing to the mounting bracket.

15. The powered actuator of claim 14, wherein the mount bracket includes a plate fixedly attached to the inner shut face and having a clearance opening, wherein the extensible member extends through the clearance opening, and wherein the clearance opening is aligned with a port provided in the inner shut face, wherein the extensible member extends through the port.

16. The powered actuator of claim 15, wherein the mount bracket includes a first flange extending transversely from a first end of the plate and a second flange extending transversely from a second end of the plate, wherein the first flange is pivotally attached via the first pivot attachment to a the gearbox housing and the second flange is pivotally attached via the second pivot attachment to the gearbox housing, and wherein the first and second pivot attachments define a pivot axis such that the gearbox housing pivots relative to the closure panel about the pivot axis.

17. The powered actuator of claim 13, wherein the closure panel has an inner panel and an outer panel defining an inner cavity, wherein the pivotal coupling includes a mount bracket configured for fixed attachment to an inner shut face extending between the inner and outer panels of the closure panel and located within the inner cavity, and wherein the gearbox housing pivots relative to the mount bracket such that the powered actuator is disposed within the inner cavity for pivotal movement relative to the inner shut face.

18. The powered actuator of claim 17, wherein the pivotal coupling includes a first pivot attachment for pivotally connecting the mounting bracket to a first side of the gearbox housing and a second pivot attachment for pivotally connecting the mounting bracket to a second side of the gearbox housing, and wherein the first and second pivot attachments are aligned to permit pivoting movement of the gearbox housing relative to the closure panel about a common pivot axis.

19. The powered actuator of claim 13, wherein the pivotal coupling comprises a mount bracket fixedly attached to an inner shut face panel within an inner cavity formed within the closure panel, and a pair of coaxially aligned pivot attachments configured to pivotally attach the mounting bracket to the housing.

20. A powered actuator for moving a closure panel of a motor vehicle between a closed position and an open position relative to a vehicle body, the powered actuator comprising:

a gearbox housing defining an interior cavity;

a gearset supported for rotation within the interior cavity of the gearbox housing;

an electric motor mounted to the gearbox housing and having a motor shaft driving the gearset;

an extensible member disposed within the interior cavity and having first end extending through a first end wall of the gearbox housing and a second end extending through a second end wall of the gearbox housing, the second end of the extensible member configured for pivotal attachment to the vehicle body, wherein the extensible member is non-rotatably translated in response to driven rotation of the gearset between a first position, corresponding to the closed position of the closure member, and a second position, corresponding to the open position of the closure member; and a pivotal coupling disposed between the second end of the gearbox housing and the closure member, the pivotal coupling including a mount bracket configured for fixed attachment to the closure member, and first and second pivotal attachments configured to couple the gearbox housing to the mount bracket for pivotal movement about a pivot axis.

21. The powered actuator of claim 20, wherein the mount bracket includes a plate configured to be fixedly secured to the closure member, a first flange extending transversely from the plate, and a second flange extending transversely from the plate, wherein the first pivotal attachment includes a first pivot mount extending from the gearbox housing and a first pivot pin pivotably coupling the first pivot mount to the first flange, wherein the second pivotal attachment includes a second pivot mount extending from the gearbox housing and a second pivot pin pivotably coupling the second pivot pin to the second flange, wherein the first and second pivot pins are aligned to define the pivot axis, and wherein the plate defines a clearance opening, wherein the extensible member translates through the clearance opening and pivots in response to movement of the closure panel between its closed and open positions.

* * * * *